Nov. 14, 1972   D. D. PETTIGREW   3,702,740
DRILL PRESS WITH COOLANT MEANS
Filed April 13, 1970   16 Sheets-Sheet 5

INVENTOR
DAVID D. PETTIGREW

BY *Strauch, Nolan, Neale, Nies & Kurz*
ATTORNEYS

Nov. 14, 1972     D. D. PETTIGREW     3,702,740
DRILL PRESS WITH COOLANT MEANS
Filed April 13, 1970     16 Sheets-Sheet 6

INVENTOR
DAVID D. PETTIGREW

BY *Strauch Nolan Neale Nies & Kurz*
ATTORNEYS

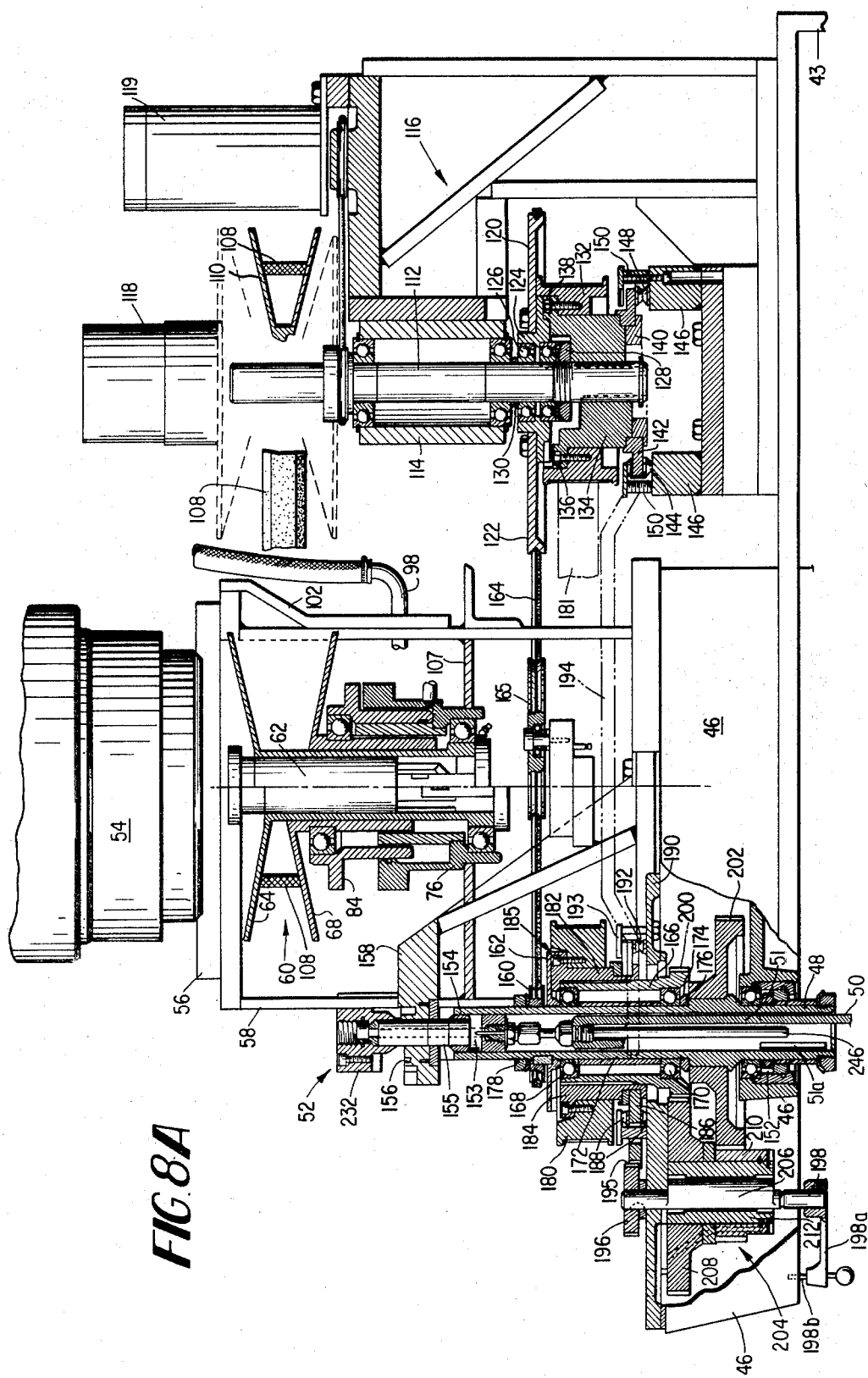

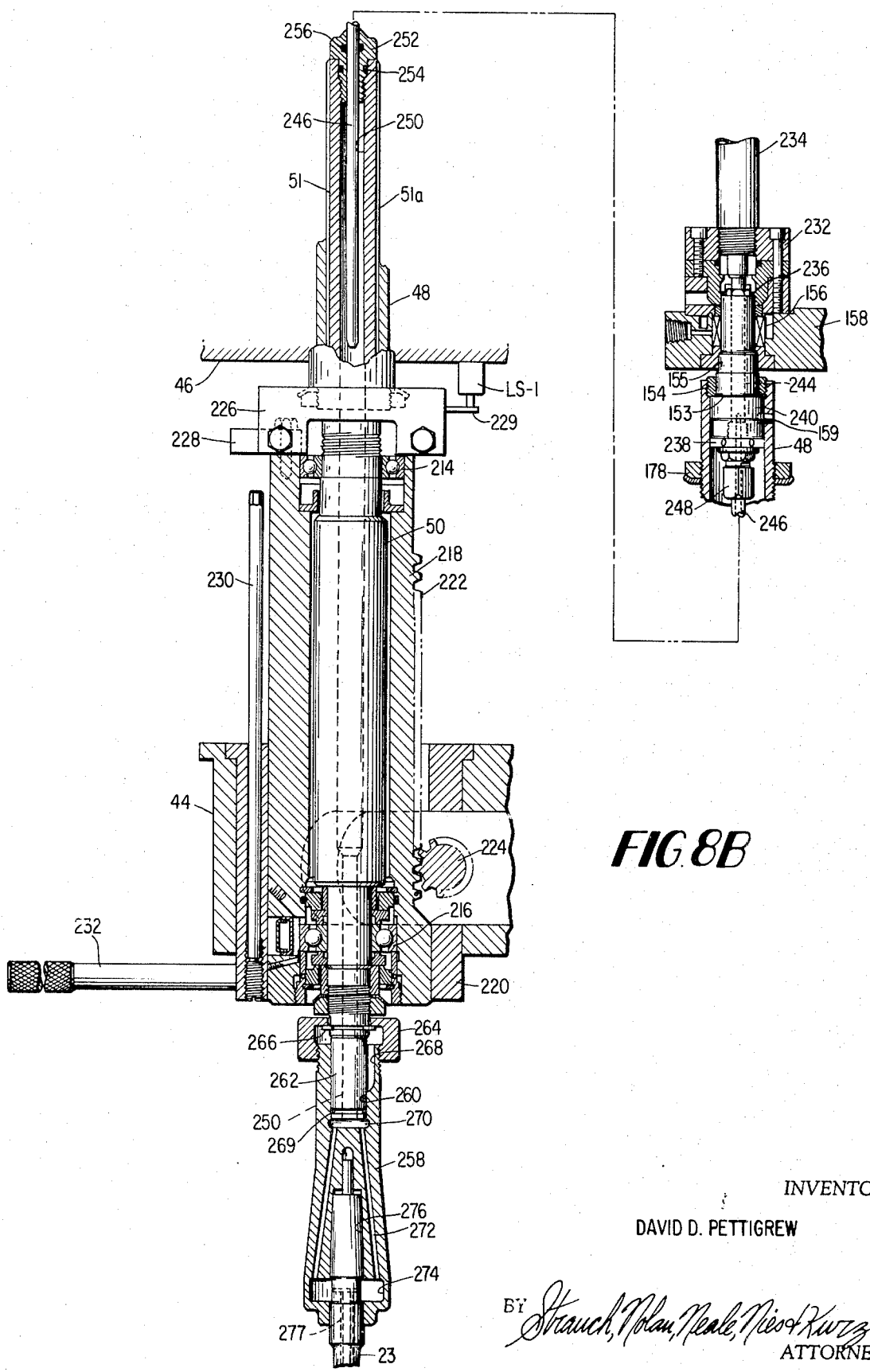

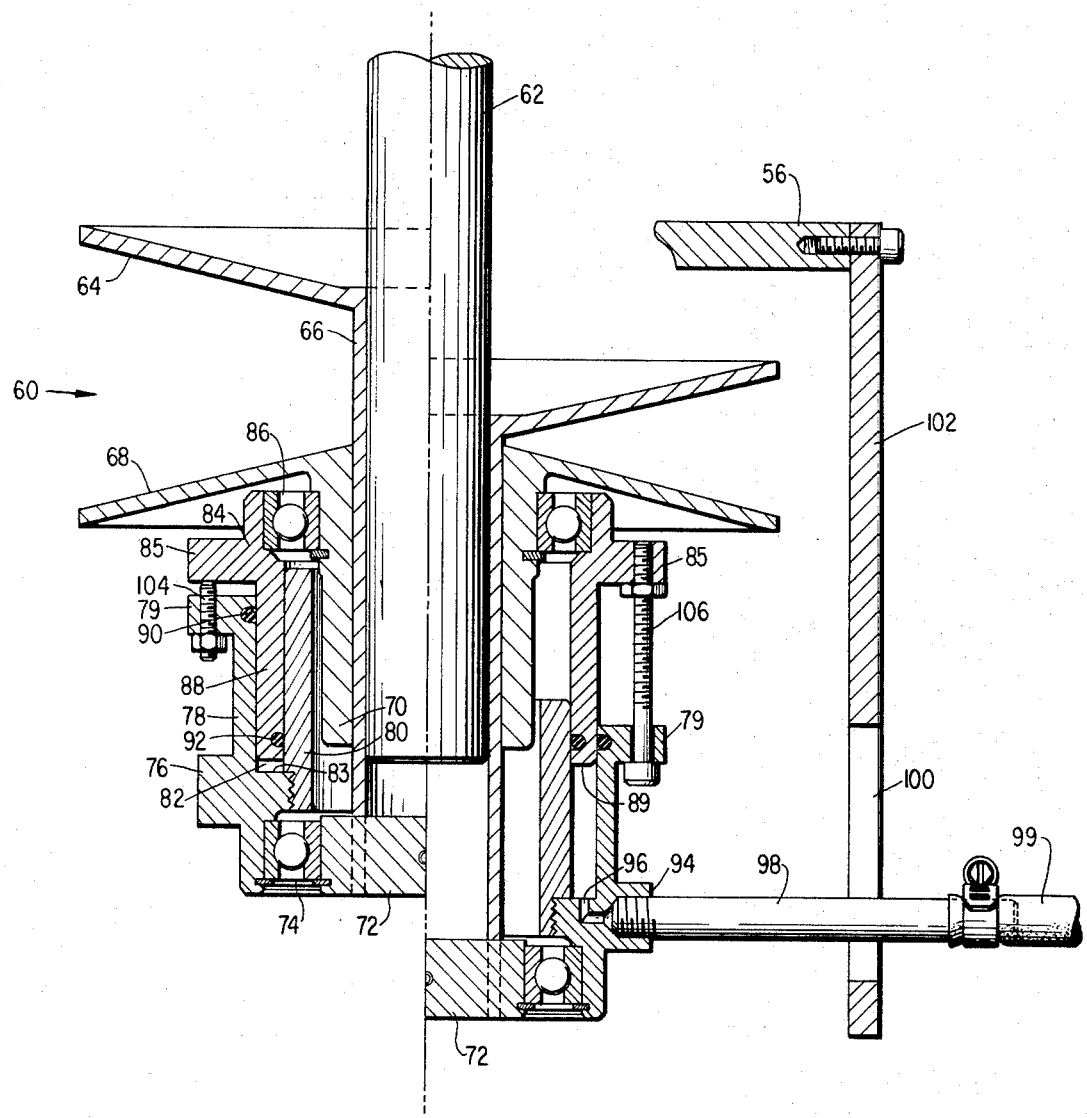

INVENTOR
DAVID D. PETTIGREW

INVENTOR
DAVID D. PETTIGREW

BY *Strauch, Nolan, Neale, Nies & Kurz*
ATTORNEYS

Nov. 14, 1972  D. D. PETTIGREW  3,702,740
DRILL PRESS WITH COOLANT MEANS
Filed April 13, 1970  16 Sheets-Sheet 13

INVENTOR
DAVID D. PETTIGREW

BY Strauch, Nolan, Neale, Nies & Kurz
ATTORNEYS

Nov. 14, 1972      D. D. PETTIGREW      3,702,740

DRILL PRESS WITH COOLANT MEANS

Filed April 13, 1970      16 Sheets-Sheet 14

INVENTOR
DAVID D. PETTIGREW

BY *Strauch, Nolan, Neale, Nies & Kurz*
ATTORNEYS

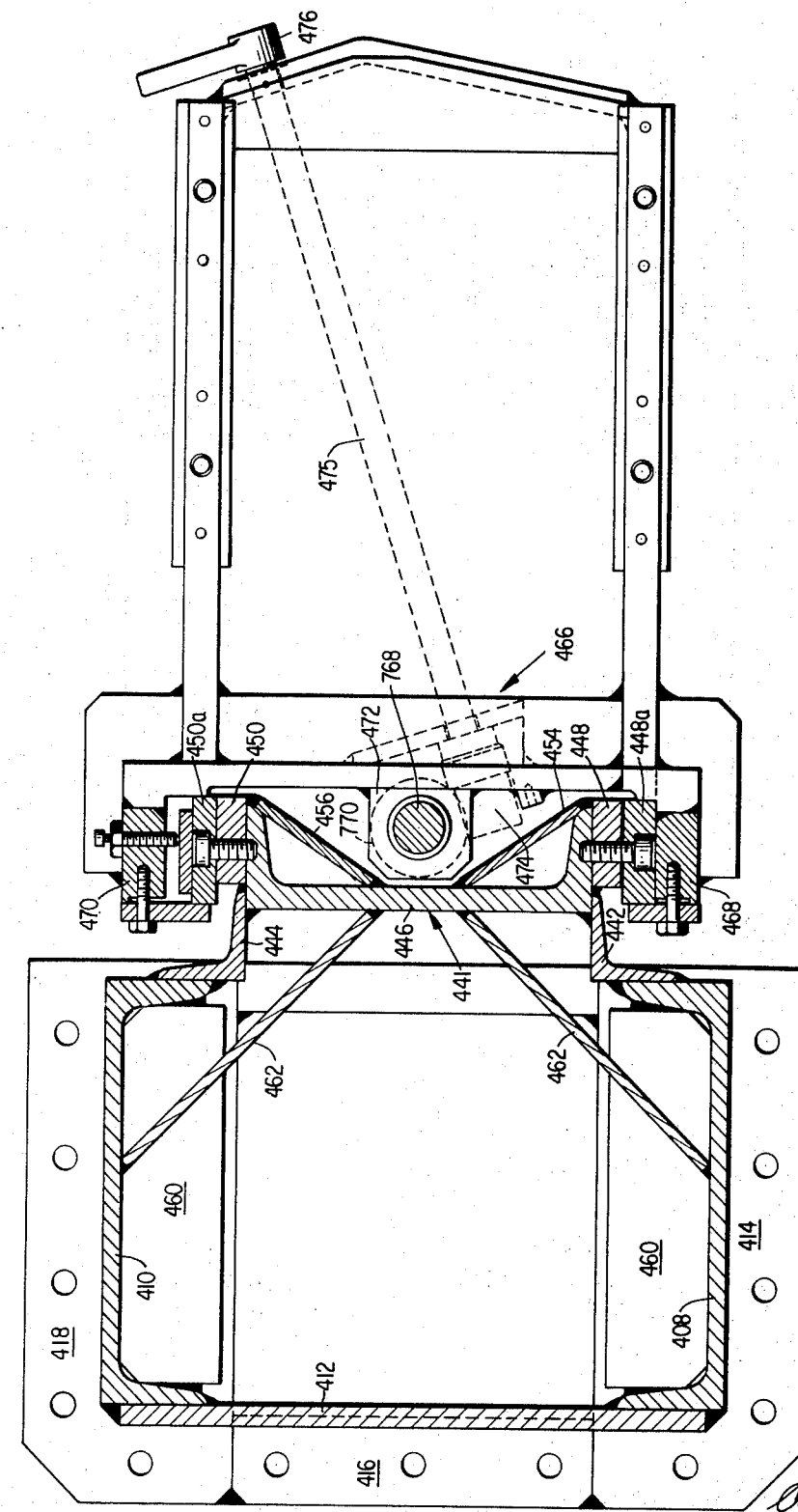

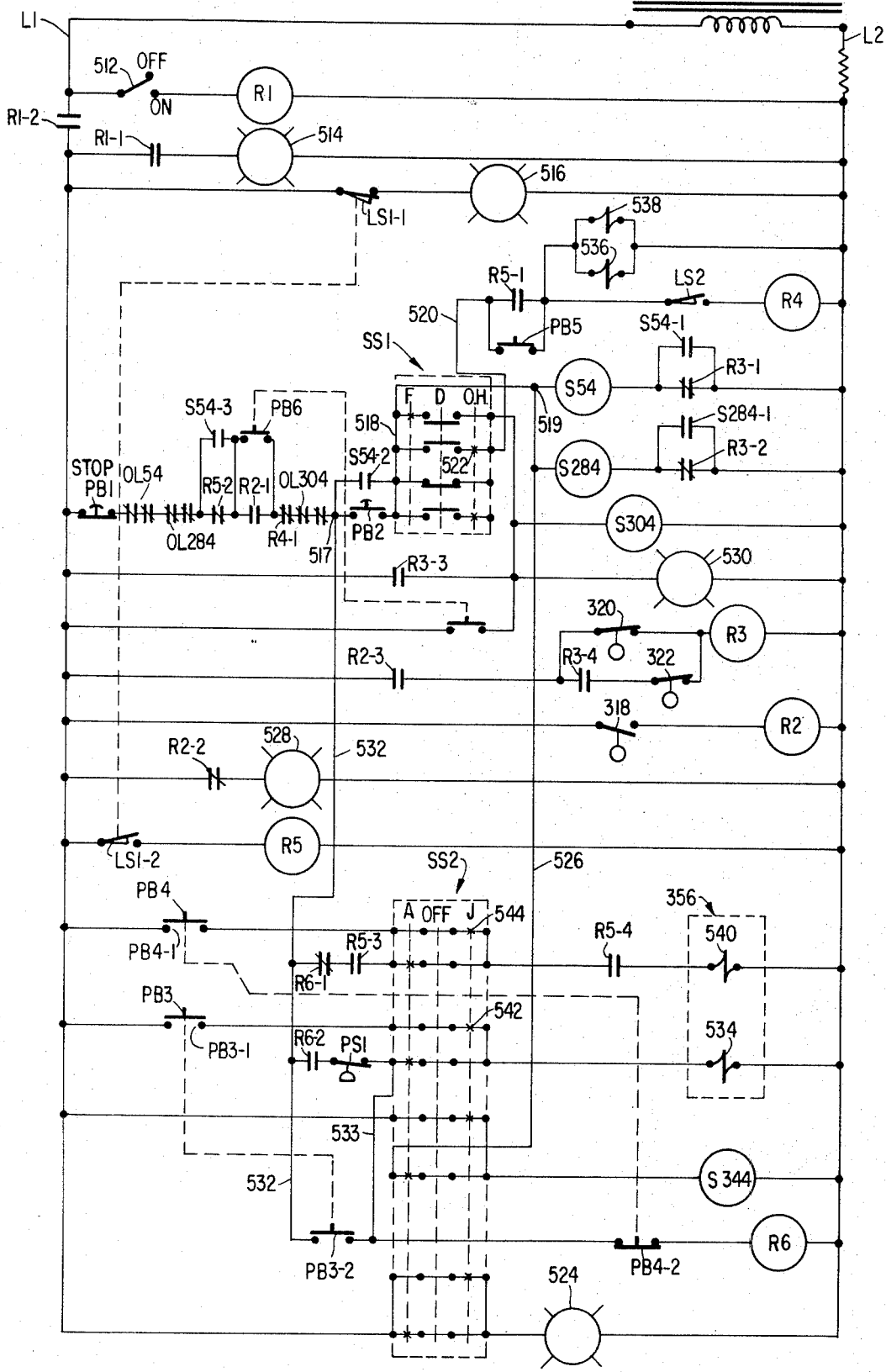

United States Patent Office 3,702,740
Patented Nov. 14, 1972

3,702,740
DRILL PRESS WITH COOLANT MEANS
David D. Pettigrew, Gibsonia, Pa., assignor to Rockwell Manufacturing Company, Pittsburgh, Pa.
Filed Apr. 13, 1970, Ser. No. 27,786
Int. Cl. B23b 39/00, 47/14, 47/18
U.S. Cl. 408—56
27 Claims

ABSTRACT OF THE DISCLOSURE

An oil-hole drill press having an infinitely variable speed spindle drive system and a hydraulically operated, infinitely variable rate feed system for rotating a drill and feeding it into a workpiece at a selected high speed and feed rate substantially equal to the maximum cutting speed of the metal of the workpiece for acceptable tool life. The spindle structure includes driving and driven spindles rotatable together, with the driven one being axially slidable within the driving spindle, and both spindles include passagesways through which an oil coolant is supplied to the tip of the drill bit through an axial-through passage.

An hydraulic system pumps high pressure coolant oil to the driving spindle and recirculates spent coolant from a removable chip pan assembly at the base of the machine to a main coolant supply tank.

The drill press includes a steel fabricated C type column structure of extreme rigidity, the upper spindle support arm of which is capable of withstanding high thrust and torque loads imparted to the drill bit and spindle during operation of the drill bit at the maximum predeterminable feed penetration rates and rotational speeds for the metal of the workpiece.

BACKGROUND OF THE INVENTION

This invention relates generally to drilling machines and more particularly to a novel, improved, coolant or oil-hole drilling machine capable of drilling accurate, true holes in a wide variety of metals at the maximum determinable cutting and penetration rates for the metal workpiece with acceptable tool life not heretofore attainable with conventional solid tool drilling machines and/or known oil-hole drilling machines.

The concept and process of oil-hole drilling has been known for about forty years, but has generally been confined to automatic screw machine and turret lathes and used primarily in specialty applications for drilling deep holes, e.g., up to about twenty diameters in depth. The limited usage and acceptance of the process for more conventional high production shop applications has been attributed to the high cost of oil-hole drills which generally were considered custom items, the unavailability of suitable oil-hole drilling machines, and the resulting attitude that relatively few advantages were gained from its usage. Available oil-hole drilling machines used in the past were either specially-built custom machines or mere adaptations of conventional solid tool, dry drilling machines modified to pump coolant through the drill.

In more recent years, industry has awakened to the potential of the oil-hole drilling process and its application to more conventional, high production drilling operations. It was pointed out at an American Society of Tool and Manufacturing Engineers' Conference held in April, 1967, that a solid tool drill press built years ago, e.g., in 1918, if it had adequate speed and power, would probably drill a hole as fast as any modern solid tool drill press, due largely to the fact that there has been no major change in the condition existing at that point where the metal is cut by the solid drill. When a drill enters the metal, it is completely enclosed on all sides but one, and that one is partially blocked by escaping chips. This then creates ideal conditions for over-heating and wearing or breaking a cutting edge. Consequently, the speed of the drill and rate at which it is fed into the metal is very much limited by these existing conditions.

On the other hand, oil-hole drills direct a high pressure coolant through holes in the flutes of the oil-hole drill from the shank end down to the cutting end of the drill, with the coolant serving not only to cool the drill point but also to wash the chips upwardly out of the hole.

The conferees noted that recent advances in and availability of oil-hole drill equipment and associated coolant pumping equipment such as that illustrated in U.S. Pat. No. 3,342,086 have increased penetration rates of oil-hole drills substantially over penetration rates of conventional solid drills. While such an increase was considered impressive, it was generally agreed that in order to obtain the maximum benefit and savings from oil-hole drilling, new commercially available oil-hole drilling machines would have to be built, since existing machines simply did not have the rigidity, variable speed and feed capacities, and/or effective coolant system necessary to provide the maximum determinable cutting and penetration rates for metal workpieces with acceptable tool life desirable for production operations. It was pointed out that this inadequacy of conventional machines has been emphasized by the development of the carbide-tipped drill, since there is no commercial standard machine capable of utilizing the carbide-tipped drill to its fullest advantage in any but the smallest drill sizes.

At the conference, it was recognized that the most prevalent type of oil-hole drill press such as that illustrated by U.S. Pat. No. 2,977,827 was merely a modification of a conventional drill press with an attachment type inductor gland attached to the lower end of the spindle and receiving the shank end of the oil-hole drill. Coolant is fed into the inductor and thence through the passageways of the drill down to the cutting edge. However, it was concluded that this type of machine would not be acceptable for general application, since experiments showed that the length of the extension of the drill point from the drill spindle and spindle bearing had an appreciable effect on drill life which was improved by minimizing the total extension of the drill from the spindle. Thus, in a machine employing an inductor gland, the gland adds to this total extension and thereby decreases tool life. It was generally concluded that the shortest total extension will be obained by feeding coolant directly through the spindle rather than an external attachment type inductor.

In addition, it was also agreed that no conventional available drill press could be readily converted since none possesses the stiffness, horsepower, variable feed and speed requirements necessary for a versatile, general purpose, oil-hole drill press.

SUMMARY OF THE INVENTION

Accordingly, a primary object of this invention resides in the provision of a novel oil-hole drill press having high horsepower, and infinitely variable feed and speed capabilities and possessing sufficient rigidity to produce high penetration rates for drilling accurate and true holes in various type metals.

Another object resides in the provision of a novel oil-hole drill press including a novel variable speed drive assembly capable of rotating the drill spindle within an infinitely variable speed range, e.g., 125 r.p.m. to 10,000 r.p.m. The drive assembly includes a relatively high horsepower motor driving a variable diameter pulley arrangement which is connected to the drill spindle through an intermediate gear assembly which may be shifted to one of three possible speed ranges. Thus, a desired spindle speed may be selected by setting the gear assembly within one of the speed ranges and then adjusting the diameter of the pulleys to select a specific speed within the set range.

Still another object resides in the provision of an oil-hole drill press as described above including a novel hydraulically operated spindle feed system capable of producing drill feed or penetration rates within the wide range of 0 to 200 inches per minute.

A further object resides in the provision of an oil-hole drill press as described above including a novel constant-flow, high pressure oil cooltant system capable of delivering a flow rate of 5 gallons per minute at a pressure of 500 p.s.i. The coolant oil is fed to the drill directly through the spindle and is collected at the base of the machine and recirculated for continuing use. Flow of the coolant oil is controlled by a number of valves and relay switches to ensure that coolant is delivered only during a drilling operation and when an adequate supply of oil exists.

Still another object resides in the provision of an oil-hole drill press including a novel, two-piece spindle structure having a non-traveling upper spindle and a traveling lower spindle which rotate together through a spline connection. The lower spindle is rotatably mounted within a quill which is moved vertically by the above-described feed system. Coolant oil is fed to the top of the upper spindle and down through the upper and lower spindles to the passageways in the oil-hole drill.

A further object resides in the provision of an oil-hole drill press having a novel support structure sufficiently stiff and rigid to withstand the high thrust and torque loads generated during operation of the drill press, thereby enabling accurate hole quality and acceptable tool life to be obtained and minimizing spindle-bearing wear.

Further and more specific objects of the invention reside in the provision of a novel oil-hole drill press which includes:

(1) A variable speed spindle drive system having three infinitely variable speed ranges provided by a gear assembly shiftable to one of the speed ranges and a hydraulically operated variable diameter pulley arrangement adjustable to select a specific speed within the gear set range. The drive systems provides an overall speed range of 125 to 10,000 r.p.m.

(2) In conjunction with the drive system, a two-piece spindle structure including a non-traveling hollow upper spindle rotated by the gear assembly and a lower spindle which travels vertically within and is rotatably connected to the upper spindle by a spline connection. The lower spindle has an axial hole through which high pressure coolant is conducted to the oil-hole drill which is operatively fixed to its lower end. The lower portion of the lower spindle rotates within a vertically traveling quill by which the lower spindle and drill are fed into the metal workpiece.

(3) A hydraulic feed system for vertically moving the quill and lower spindle at feed rates varying from 0 to 200 inches per minute at a variable thrust of up to 3,000 pounds with the thrust being inversely related to the feed rate. The feed system includes suitable hydraulic controls which are advantageously located at a central control panel for ready access by an operator.

(4) A constant flow, high pressure oil coolant system capable of providing coolant through the spindle structure to the tip of the drill at a pressure of 500 p.s.i. and flow rate of 5 gallons per minute. Recirculation of the coolant is accomplished by a removable chip pan assembly at the base of the machine, a sump pump which pumps coolant from the chip pan assembly through a filter to a holding tank, and a high pressure pump which then pumps the filtered coolant from the tank to the upper end of the spindle. Suitable valving ensures that coolant is fed to the spindle only during a drilling operation and enables low pressure flood coolant to be diverted from the sump pump to a flood line during conventional drilling.

(5) A sheet-steel "shower-curtain" enclosure enclosing the splash work area of the machine and extending from the bottom of the drill head to the base, the enclosure confining the coolant splash and protecting the operator during the drilling operation. The side and front panels of the enclosure are easily removed to permit free access to the work area.

(6) A rigid, C-shaped drill machine including a column support structure whose total deflection in any direction is less than 0.0005 inch under design loads of 2,000 pounds thrust and 1,850 inch pounds torque.

(7) Suitable electrical and hydraulic controls providing various safety features and lockouts for the drill press to ensure proper operation of the machine components and protect the operator. All of the manually operated controlled handles and switches are located at a central control panel area removed from the work area of the machine to enable the operator to quickly accomplish various adjustments and control functions as desired or required.

Other objects and advantages will become more apparent from reading the following detailed description of the invention with reference to the accompanying drawings in which like numerals indicate like parts and from the appended claims.

BRIEF DESCRIPTION OF THE DRAWINGS

FIG. 8A is a fragmentary, partially sectioned side elevation view of the variable speed spindle drive system drivingly connected to the upper spindle of the two piece spindle structure mounted on the head of the drill press;

FIG. 8B is a fragmentary partially sectioned side elevation view of the quill and lower spindle of the two-piece spindle structure;

FIG. 9 is a fragmentary side elevation section view of the primary hydraulically operated, variable diameter pulley which is part of the drive system shown in FIG. 8A, the right and left sides of FIG. 9 showing the pulley in its maximum and minimum diameter positions, respectively;

FIG. 18 is a sectional plan view of the column and table bracket structure taken along line 18—18 of FIG. 7 illustrated with the table removed; and FIG. 19 is a schematic diagram of the electrical control system for the drill press.

DETAILED DESCRIPTION OF THE INVENTION

Figure 1:
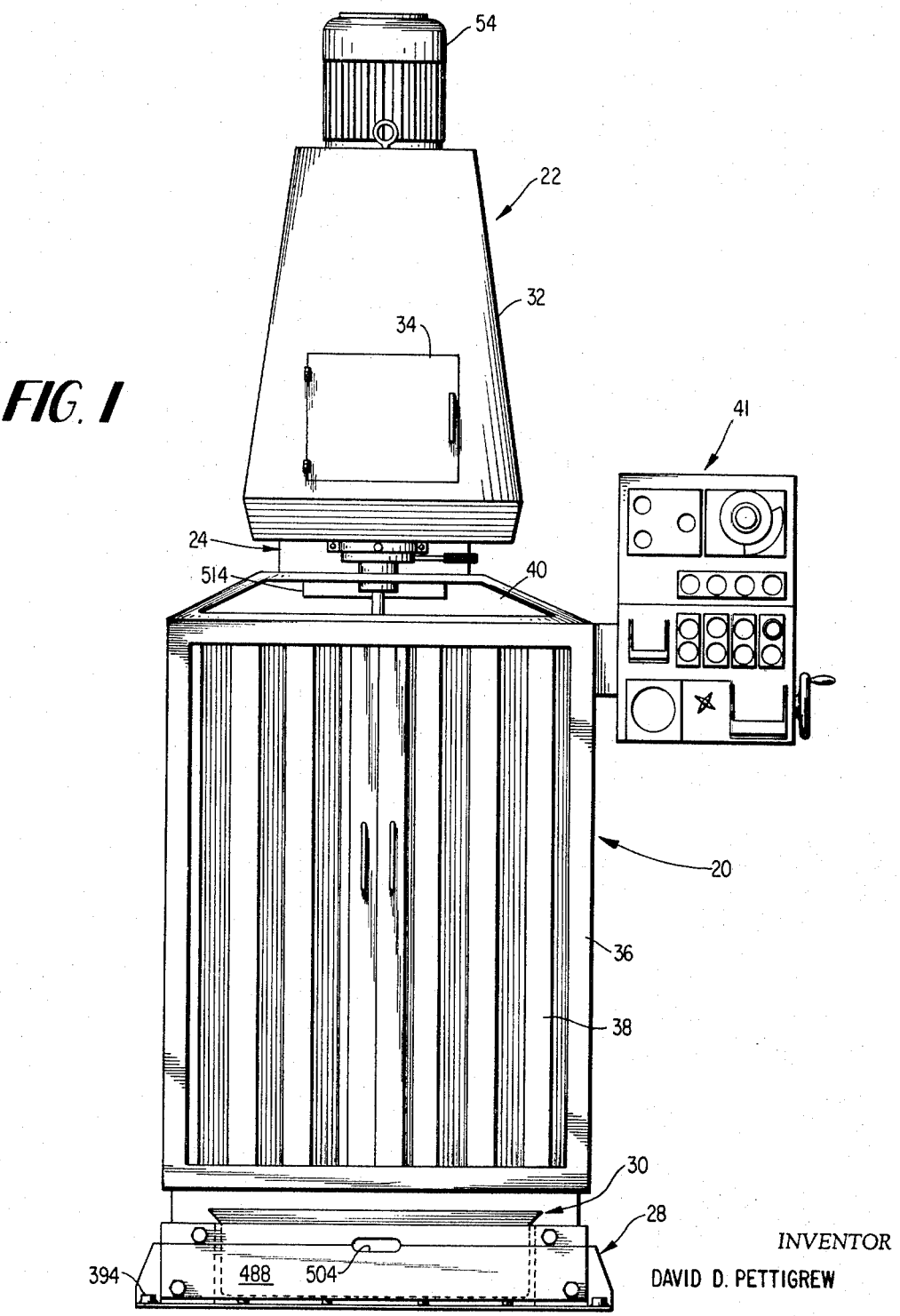
FIG. 1 is a front elevation view of the novel oil-hole drill press of the invention with the shower curtain splash enclosure and sheet steel shroud for the drill head in place.

Referring now to FIGS. 1–7 of the drawings, the novel oil-hole drilling machine 20 is of a C-shape configuration formed by a head section 22 which includes the feed drive components for oil-hole drill 23, an upright box-like support column 24 from which head section 22 is supported, and a workpiece supporting table assembly 26. Column 24 is mounted on the rear end of a base section 28 formed in a shape of a "crowsfoot" to accommodate a removable chip pan assembly 30 positioned under table assembly 26 to collect the chips and spent coolant.

As shown in FIGS. 1–4, during operation of machine 20, a sheet-steel shroud 32 surrounds head section 22 and has a plurality of covered access openings 34 which permit ready access to the machine components such as the spindle drive system and feed mechanism for adjustment and inspection and maintenance purposes. Shroud 32 has a rear opening 33 through which various electrical and fluid lines extend for connection to their respective machine components. The shroud protects the operator against accidental disentanglement in the drive system and against flying machine parts in the event of a catastrophic machine failure.

The work or splash area of the machine is enclosed by a sheet-steel "shower curtain" enclosure 36 which extends from underneath head section 22 to just above chip pan assembly 30 and serves to confine and collect the chips and spent high pressure coolant in pan assembly 30. Enclosure 36 has front accordian-type folding doors 38 and removable side panels 39 which are readily opened and/or removed to provide access to table assembly 26 and the cutting area of the drill. In an oil-hole drilling operation, doors 38 and panels 39 are closed and the drilling operation may be observed through a plurality of transparent window sections 40 provided in the top of enclosure 36. A mercury arc lamp 514 is provided within enclosure 36 to enable the operator to observe the cutting operation.

A central control panel 41 is supported from column 24 and includes all the manually operated hydraulic and electrical control actuators which are used to regulate operation of the machine. An electrical fuse and switch box 42 is mounted on the rear column 24.

Figure 5:
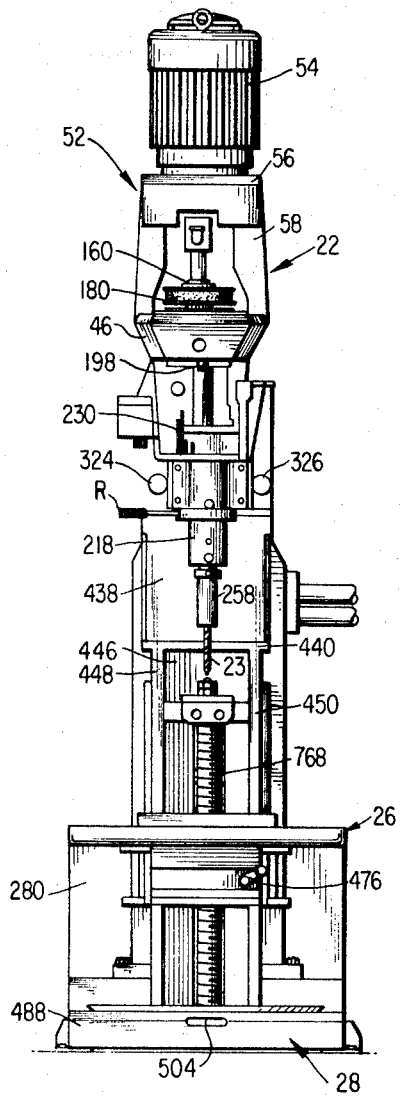
FIG. 5 is a fragmentary front elevation view of the novel drill press with the splash enclosure and drill head shroud removed.
Figure 6:
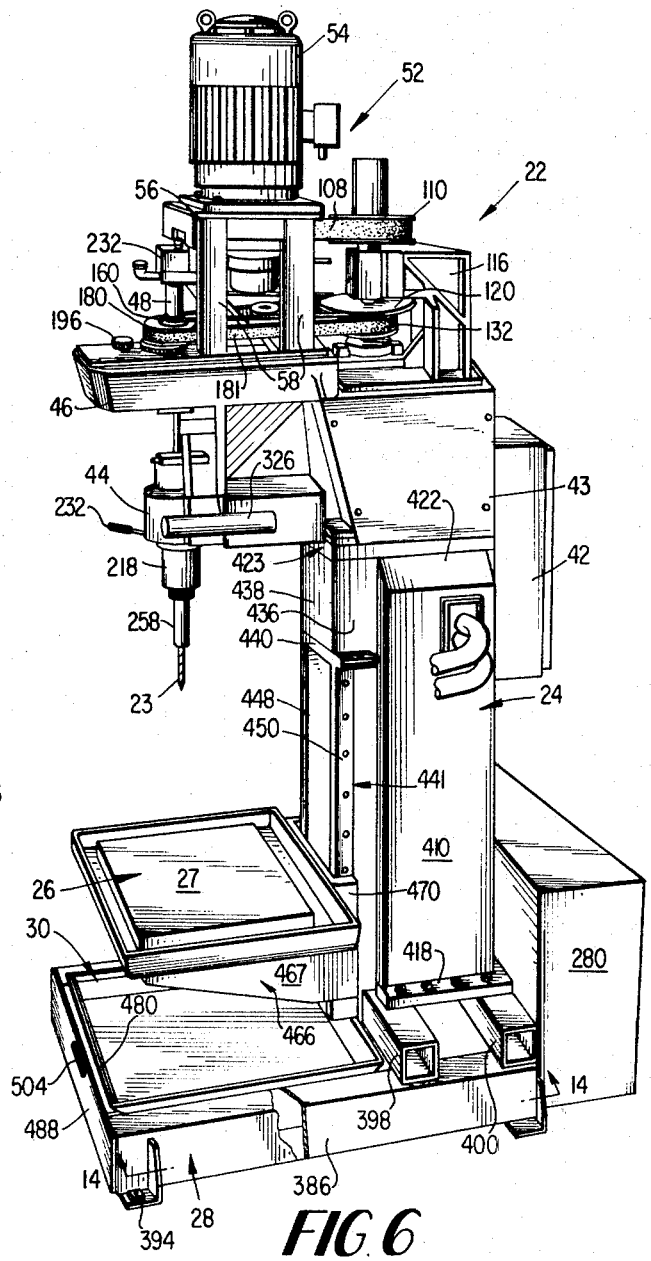
FIG. 6 is a right side fragmentary perspective view of the drill press of FIG. 5.
Figure 7:
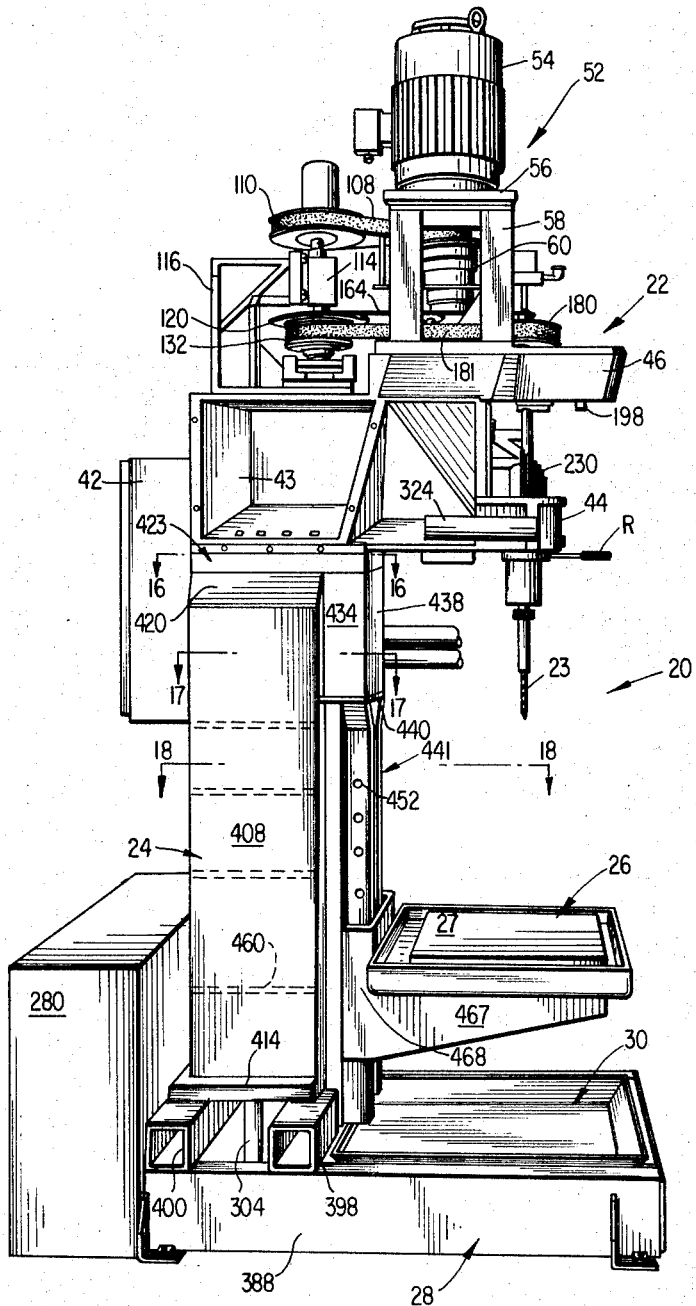
FIG. 7 is a left side fragmentary perspective view of the drill press of FIG. 5.

Referring now to FIGS. 5–7, head section 22 is a self-containing unit and includes a rear metal casing portion 43 which is bolted on the top of column 24, a lower spindle head or arm 44 fixed to casing portion 43 and projecting horizontally forward above table assembly 26, and an upper back gear housing 46 fixed to and extending forwardly from casing 43 above spindle head 44. Casing portion 43 has a number of cavities or compartments within which some of the electrical and hydraulic components may be mounted.

As shown in FIGS. 8A and 8B, the spindle structure for rotating and vertically moving drill 23 is a two-piece structure including a hollow upper spindle 48 rotatably mounted in housing 46 and a lower spindle 50, the upper end 51 of which is vertically reciprocable within upper spindle 48 and rotatable therewith through a spline connection 51a.

THE VARIABLE SPEED DRIVE SYSTEM AND SPINDLE STRUCTURE

Figure 10:
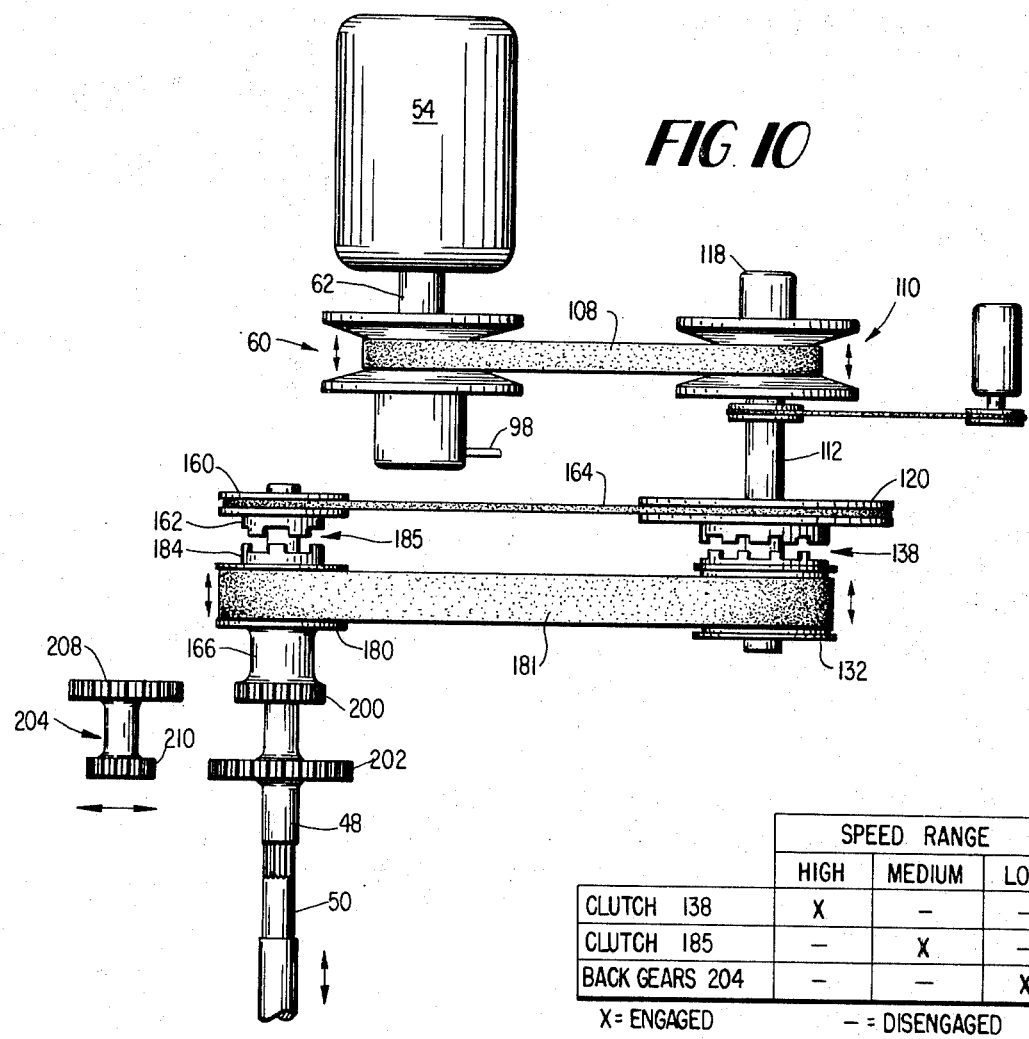
FIG. 10 is a schematic illustration of the variable speed spindle drive system shown in FIG. 8A.

Referring particularly to FIGS. 8A and 10, the drive assembly 52 for rotating upper spindle 48 includes a motor 54 mounted on a support platform 56, the corner legs 58 of which are fixed to the top of housing 46. A hydraulically operated, variable diameter pulley 60 (FIG. 9) includes an inner conical disc 64 having a hub 66 slidably mounted on motor shaft 62 by a spline connection and an outer conical disc 68 having a hub 70 slidable on hub 66 and rotatable therewith. The lower end of hub 66 is closed by an end plate 72 which engages the inner race of a lower roller bearing 74.

A lower non-rotative sleeve member 76 has a lower annular face against which the outer race of bearing 74 seats and spaced outer and inner cylindrical sleeve sections 78 and 80 which form an annular recess 82 therebetween. The inner surface of section 80 is spaced from hub 70. An upper non-rotative sleeve member 84 has an annular face against which the outer race of upper roller bearing 86 seats, the inner race of which seats against outer disc hub 70. Member 84 has a cylindrical sleeve section 88 which closely fits and slides within annular recess 82. O-ring 90 provides a seal between the sliding surfaces of sleeve sections 78 and 88 and O-ring 92 provides a seal between the sliding surfaces of sleeve sections 80 and 88.

A fitting 94 is provided on sleeve member 76 and has a fluid passageway 96 communicating with the base 83 of recess 82. A rigid pipe section 98 threads into fitting 94 and is movable vertically within a slot 100 of a guide bracket 102 fixed to the platform 56. Pipe 98 is connected via flexible tube 99 to a suitable fluid source. The effective diameter of pulley 60 is adjusted by introducing into or withdrawing fluid from recess 82 which acts between base 83 and end face 89 of sleeve section 88 to move cones 64 and 68 relative to each other. The minimum effective diameter of the pulley is set by an adjusting screw 104 which threads through the flange 79 of sleeve section 78 and abuts against flange 85 of sleeve member 84. The maximum effective diameter is established by a screw rod 106 which threads into flange 85 of sleeve member 84 and freely passes through an opening in flange 79. Rotation of sleeve members 76 and 84 is prevented by conduit 98 fixed against rotation within slot 100 and guide 102.

Pulley 60 through a belt 108 drives a second variable diameter pulley 110 which is fixed against rotation on the upper end of a jackshaft 112 mounted parallel to motor shaft 62 and upper spindle 48. Jackshaft 112 rotates within a bearing housing 114 that is supported from bracket assembly 116 fixed to the top of drill head casing 43. Pulley 110 is a conventional follower type in which the relatively movable pulley cones are spring biased by a spring assembly in hub casing 118 to a maximum effective diameter position shown in full in FIG. 8A.

With no fluid in recess 82 of pulley 60, the spring force in pulley 110 will position pulley 110 in its maximum diameter position and, through the tension in belt 108, pulley 60 in its minimum diameter position. As fluid is introduced into recess 82, the effective diameter of pulley 60 is increased and the diameter of pulley 110 is decreased against the spring force in hub assembly 118.

An electrical tachometer 119 mounted on bracket assembly 116 is belt connected to shaft 112 and has a readout device located on the central control panel 41 to indicate the speed at which shaft 112 is being driven.

A large diameter pulley 120 includes a disc 122 connected to a central hub 124 which is rotatable on the lower output end of shaft 112 through the roller bearing assembly 126 vertically positioned on the shaft between a threaded nut 128 and collar 130.

A smaller diameter timing pulley 132 includes a hub portion 134 which is keyed on shaft 112 against rotation but is slidable thereon to permit a limited amount of axial movement along the shaft. The upper edge of hub 134 is formed with a plurality of clutch teeth 136 which cooperate with a plurality of mating clutch teeth formed on the periphery of hub 124, the mating teeth forming a clutch 138 which couples pulleys 122 and 132 for rotation together when pulley 132 is shifted upwardly as shown in the right pulley position in FIG. 8A.

The shifting mechanism for pulley 132 includes an annular ring cam member 140 connected to the bottom of hub 134, with ring 140 having radially extending flanges 142 formed with a plurality of dimples 144 at predetermined radial positions which rest on support blocks 146. Blocks 146 also have dimples 148 at selected radial positions so that, when ring 140 is rotated through a predetermined angular distance by means to be described (see FIG. 11) from the position shown in the left hand section of FIG. 8A in which dimples 144 rest on the upper surface of blocks 146 to a position shown at the righthand section of FIG. 8A in which lower dimples 144 ride up on dimples 148, pulley 132 will be raised to engage clutch 138 and thereby cause pulley 120 to be rotated with pulley 132 and shaft 112. A pair of retainer dogs 150 is mounted on blocks 146 to suitably guide and retain ring 140 in its selected clutch engaged or disengaged position.

The upper hollow spindle 48 is rotatably supported in housing 46 by lower high-speed bearing assembly 152. A fluid conduit fitting 153 is retained in the upper end of spindle 48 by a threaded lock nut 154 and includes an outer shaft section 155 which is rotatably supported by upper high-speed, bearing assembly 156 mounted on a bracket 158 that is fixed to the top of housing 46.

A small diameter pulley 160 and toothed clutch plate 162 are keyed on spindle 48, with pulley 160 being driven from pulley 122 by a polyflex V-belt 164, the tension of which is adjusted by an idler pulley 165 supported from bracket 158. A sleeve 166 is rotatably mounted on spindle 48 by spaced bearings 168 and 170, the inner races of which are separated by a spacer collar 172. A ring 172 is positioned between the inner race of bearing 170 and an outer annular shoulder 176 on spindle 48. A nut 178 threads onto spindle 48 against pulley 160 and, along with shoulder 176, retains the elements in operative position.

A larger diameter timing pulley 180 is driven from pulley 132 by a timing belt 181 and includes a hub 182 which is splined on the upper portions of sleeve 166 so as to be axially slidable on the sleeve but rotatable on spindle 48. Hub 182 is formed with a plurality of clutch teeth 184 which engages clutch plate 162 when pulley 180 is shifted axially, with teeth 184 and plate 162 forming a clutch 185 by which a drive connection may be established between pulley 180 and spindle 48.

An annular gear shifting cam plate 186 rotataably slidably engages the lower portion of hub 182 and includes a plurality of upper and lower dimples 188, the latter of which rest on the upper face of a plate 190 when clutch 185 is disengaged. Plate 190 also has a plurality of dimples 192 formed on its upper surface at predetermined angular positions so that when plate 186 is rotated to a selected position lower dimples 188 ride up on dimples 192 to raise pulley 180 and engage clutch 185. A plurality of guide and retaining ears 193 engage the upper dimples 188 and retain gear plate 186 in a set position. As shown in FIG. 8A and schematically in FIG. 11, a shift rod 194 extends between and connects plate 186 and ring 140 for rotation together. Gear plate 186 has a forward gear segment 195 which is moved by a pinion 196 fixed on the upper end of a shaft 198 which is part of a backgear assembly 204 and is rotatably mounted in gear housing 46.

Pinion 196 may be rotated to position gear plate 186 and ring 140 in one of three possible set positions, each representing a specific speed range. The gear plate 186 and ring 140 are so designed that clutches 138 and 185 cannot be both engaged at the same time, i.e. the angular position of dimples 144 of plate 140 is different than that of dimples 188 on gear plate 186 so that pulleys 132 and 180 cannot be raised together.

Figure 11:
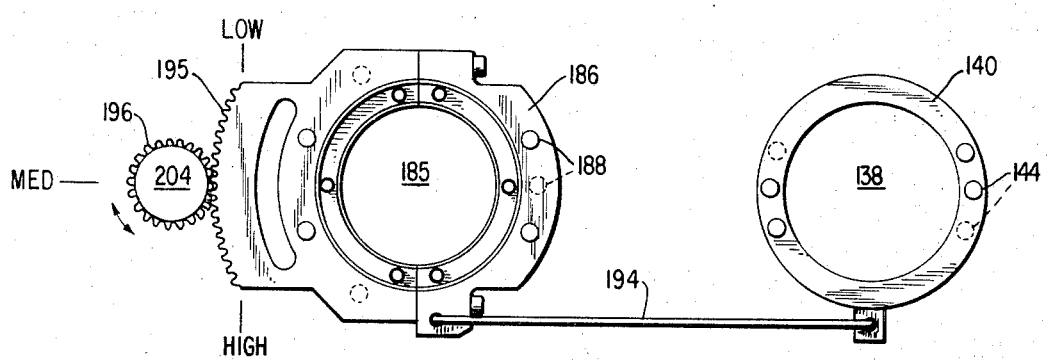
FIG. 11 is a schematic plan illustration of the shifting mechanism by which the drive system of FIG. 8A is shifted to one of its three speed ranges.

As is evident from the description thus far and from the schematics shown in FIGS. 10 and 11, in one set position representing the high speed range, clutch 138 will be engaged and clutch 185 disengaged and spindle 48 is driven from shaft 112 through pulley 132, clutch 138, pulley 120, belt 164, and pulley 160. Pulley 180 and sleeve 166 will simply freely rotate on the spindle.

In a second set position representing an intermediate speed range, only clutch 185 will be engaged and spindle 48 is driven from shaft 112 through pulley 132, timing belt 181, pulley 180, and clutch plate 162. Pulley 120 will be freely rotating on shaft 112.

In a third set position representing a low speed range, neither clutch 138 nor clutch 185 will be engaged and a low speed drive for spindle 48 is established through a first smaller spur gear 200 formed on the lower end of sleeve 166, a second larger spur gear 202 keyed on spindle 48, and a back gear assembly 204 by which gears 200 and 202 are drivingly connected. Gear assembly 204 includes the shaft 198, an eccentric hub portion 206 formed on the shaft, and upper and lower gears 208 and 210 which are keyed on a sleeve 212 that is rotatably mounted on hub 206.

The lower end of shaft 198 extends below housing 46 and may be rotated by a suitable hand lever 198a which has a pin 198b that fits in suitable recesses in housing 46 to lock shaft 198 and pinion 196 in a set position. To operate spindle 48 within the low speed range, the back gear assembly 204 will be positioned as shown in FIG. 8A with gear 208 engaging gear 200 and gear 210 engaging gear 202. Both clutches 138 and 185 will be disengaged and spindle 48 will be driven from shaft 112 through pulleys 132 and 180, sleeve 166, and gears 200, 208, 210 and 202.

In a prototype drill press constructed according to the invention, the various components of the drive system were designed so that the overall speed range was 125 to 10,500 r.p.m., with the low speed range being 125 to 625 r.p.m., the intermediate range being 550 to 2,700 r.p.m., and the high speed range being 2,100 to 10,500 r.p.m. Motor 54 has a 7½ HP, 1,725 r.p.m., 220 volt three phase motor and variable diameter pulleys 60 and 110 were capable of providing a speed ratio of 5:1 within each of the ranges and of varying the speed of jackshaft 112 from 600 to 3,000 r.p.m.

Referring again to FIGS. 8A and 8B, the lower spindle 50 is rotatably mounted by upper and lower high-speed bearing assemblies 214 and 216 within a vertically reciprocable quill 218. The quill is non-rotatably slidably mounted in a depth-of-cut adjusting sleeve 220 which is rotatable through about 180° in the stationary spindle head 44.

Figure 13:
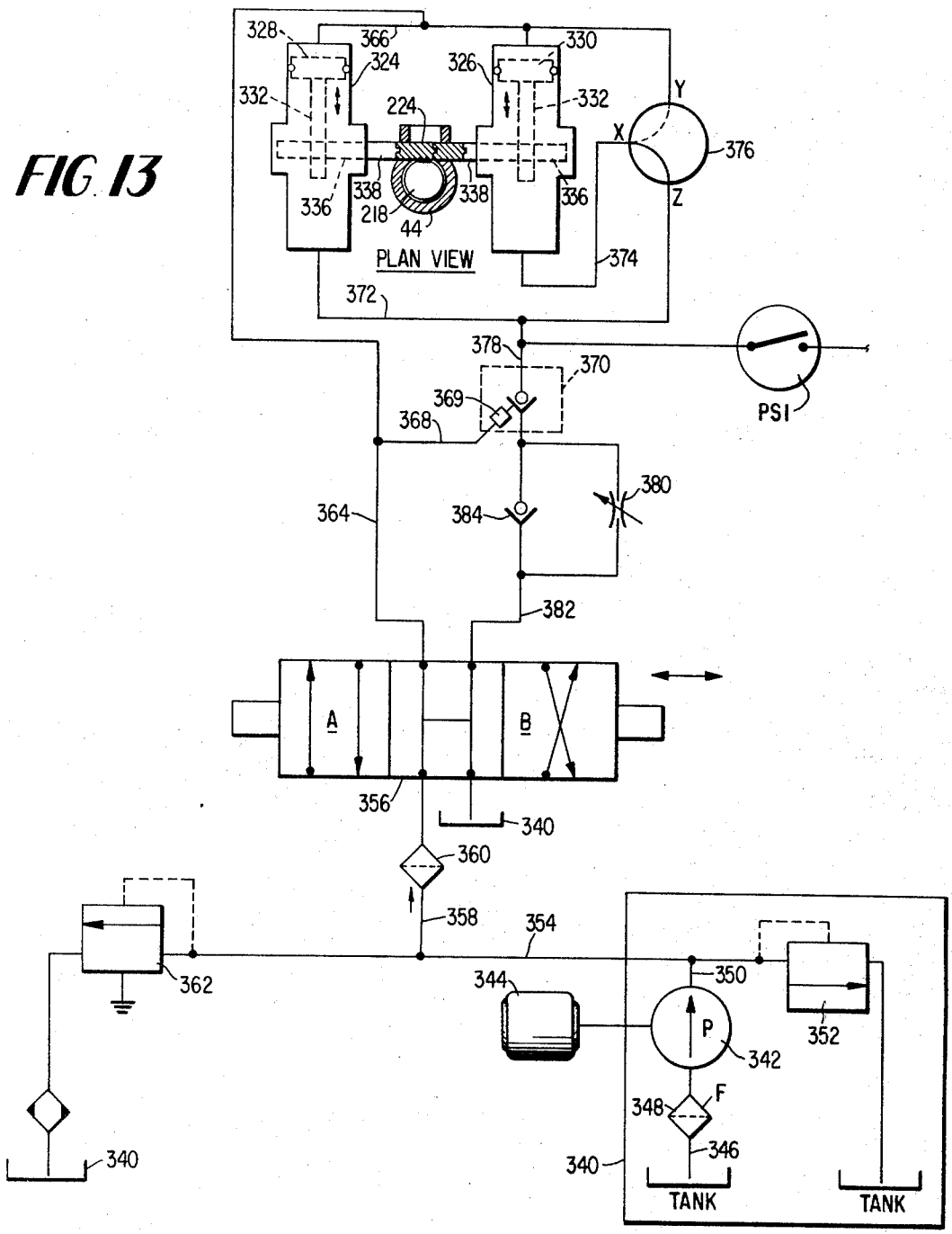
FIG. 13 is a schematic illustration of the hydraulic variable rate feed system for moving the quill and lower spindle shown in FIG. 8B vertically, with the two feed cylinders, drive pinions, and quill illustrated as they would appear in top plan view of the machine.

Quill 218 is formed at its rear with a gear rack 222 which is driven by split helical gear pinion 224 to reciprocate the quill vertically and thereby feed the rotating spindle 50 and drill 23 into the work. The hydraulic feed system for rotating pinion 224 is shown in FIG. 13 and will be described hereinafter. The use of the split pinion 224 eliminates backlash from the quill feed.

An annular plate 226 is connected to the upper end of quill 218 for vertical movement therewith and includes a laterally projecting stop member 228 and a limit switch actuating bar 229. Sleeve 220 has a plurality of stop rods 230 of different lengths extending upwardly therefrom and a handle 232 at its lower end whereby the sleeve may be suitably rotated to position one of the rods 230 into the vertical path of stop member 228. In this manner, the maximum spacing between the stop 228 and the upper end of a selected one of rods 230 establishes the maximum depth of hole which may be drilled with the machine.

Actuating bar 229 is adapted to engage a limit switch LSI mounted on spindle head 46 to sense when the quill is in its raised non-drilling position. The function of switch LSI is described hereinafter with reference to the control diagram of FIG. 19.

As indicated previously, the upper end 51 of lower spindle 50 is spline connected at 51a to upper spindle 48 so that spindle 48 and 50 rotate together while spindle 50 is vertically slidable within spindle 48.

During the drilling operation, high pressure coolant oil is contiuously fed to the cutting tip of the oil-hole drill 23 from an oil inductor 232 fixed on the top of bracket 158, the inductor 232 having an oil delivery conduit 234 threaded into its upper end. The upper end of shaft section 155 of fitting 153 rotates within inductor 232 by means of bearing 156 and seal 236. The upper end of the internal passageway of spindle 48 tapers outwardly slightly and snugly receives mating tapered portions 238 and 240 of fitting 153, with a nut 154 threading into the upper end of spindle 48 to lock fitting 153 within spindle 48 by means of dowel pin 159. Fitting 153 has an internal passageway 244 extending throughout its length, and an elongated tubular member 246 having a coupling 248 threaded into the bottom of fitting 153 is in fluid communication with and forms an extension of fluid passageway 244.

Spindle 50 has an internal coolant passageway 250 extending through its length, the upper end of passageway 250 being closed by a nipple 252 which slidably surrounds tube 246, thereby permitting the coolant to pass from the tube into passageway 250. An O-ring 254 provides a seal between the contacting surfaces of spindle 50 and nipple 252 and O-ring 256 seals the sliding contact surfaces between tube 246 and nipple 252.

A spindle adapted nose or chuck 258 includes an upper slightly outwardly tapered bore 260 which snugly receives the mating lower reduced end 262 of spindle 50 and is drawn tight thereon by a collar 264 threaded at one end on nose 258 and acting at its other end against an annular ring 266 seated in a recess on spindle 50. Nose 258 is keyed at 268 against rotation on spindle end 262. An O-ring 269 seals between the mating surfaces of spindle end 262 and nose 258.

The lower end of bore 260 terminates in a slightly enlarged fluid chamber 270 which communicates with the lower end of passageway 250 to receive the coolant oil therefrom. A plurality of vertical passages 272 connect chamber 270 with an enlarged internal annular recess 274 communicating with the tapered bore 276 which receives the tapered shank end of oil-hole drill 23. A typical drill has internal passageways 277 which communicate wit recess 274 to conduct the coolant oil to the cutting tip of the drill.

Several adapter noses 258 may be provided to accommodate various size Morse taper drills and the noses are readily interchanged by adjustment of collar 264. Also, the spindle end 262 may be provided with a female socket taper to accommodate quick-change coolant-hole chucks that are now becoming commercially available.

In operation, therefore, coolant oil is fed to cutting end of drill 23 by way of conduit 234, inductor 232, passageway 244, tube 246, passgeway 250, chamber 270, passages 272, recess 274, and drill passageways 277.

THE COOLANT SYSTEM

Figure 2:
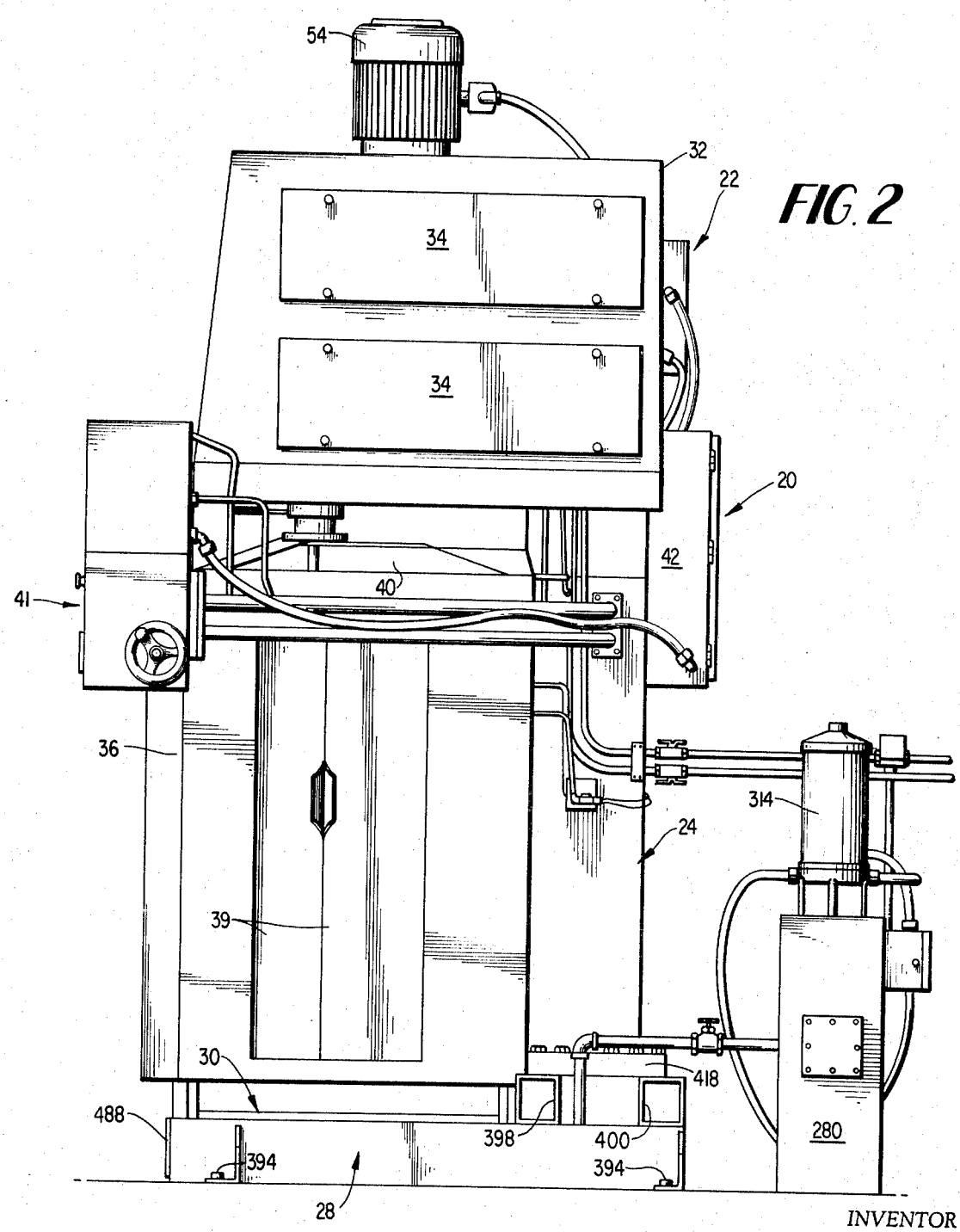
FIG. 2 is a right side elevation view of the drill press of FIG. 1.
Figure 3:
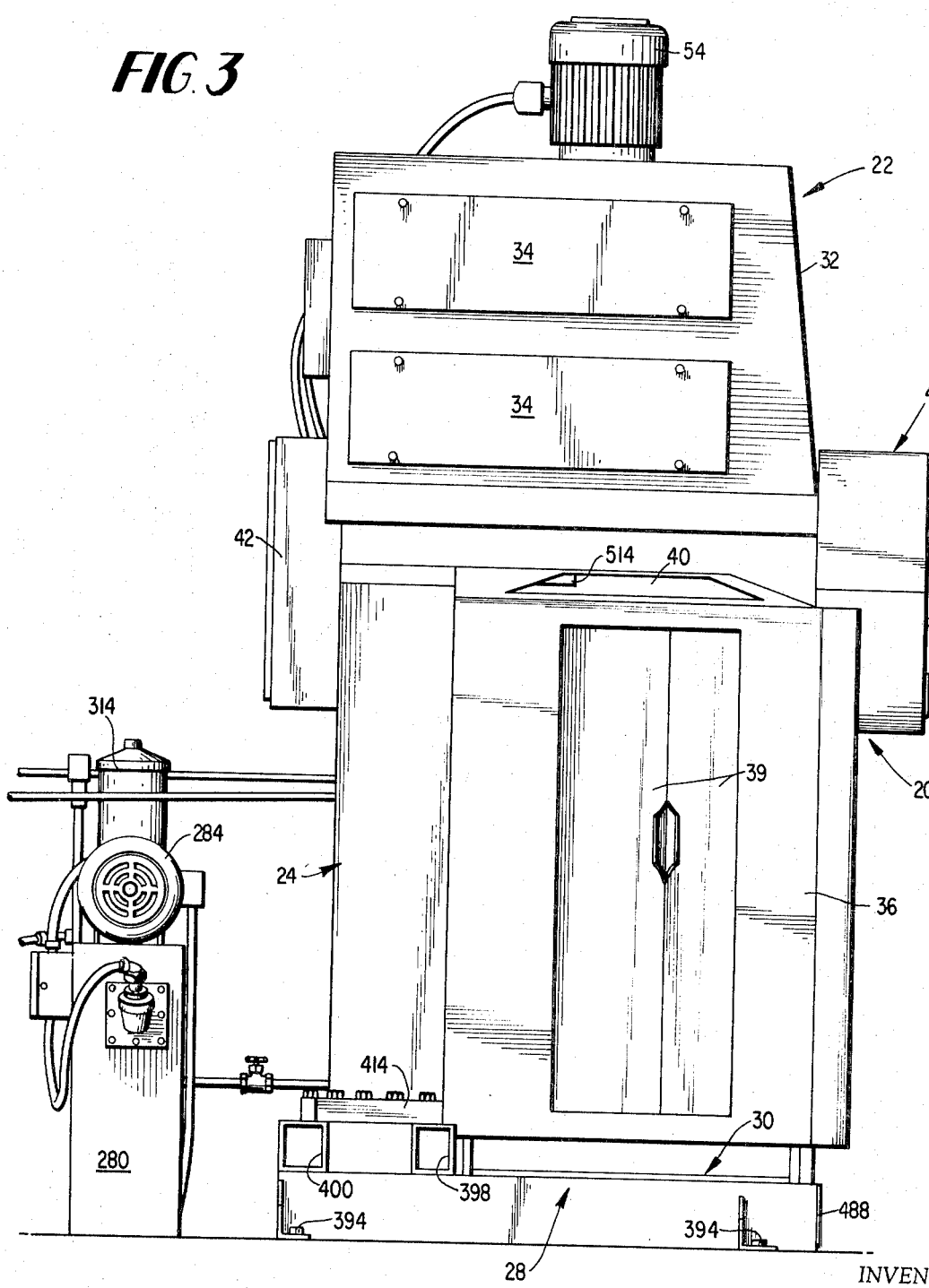
FIG. 3 is a left side elevation view of the drill press of FIG. 1.
Figure 12:
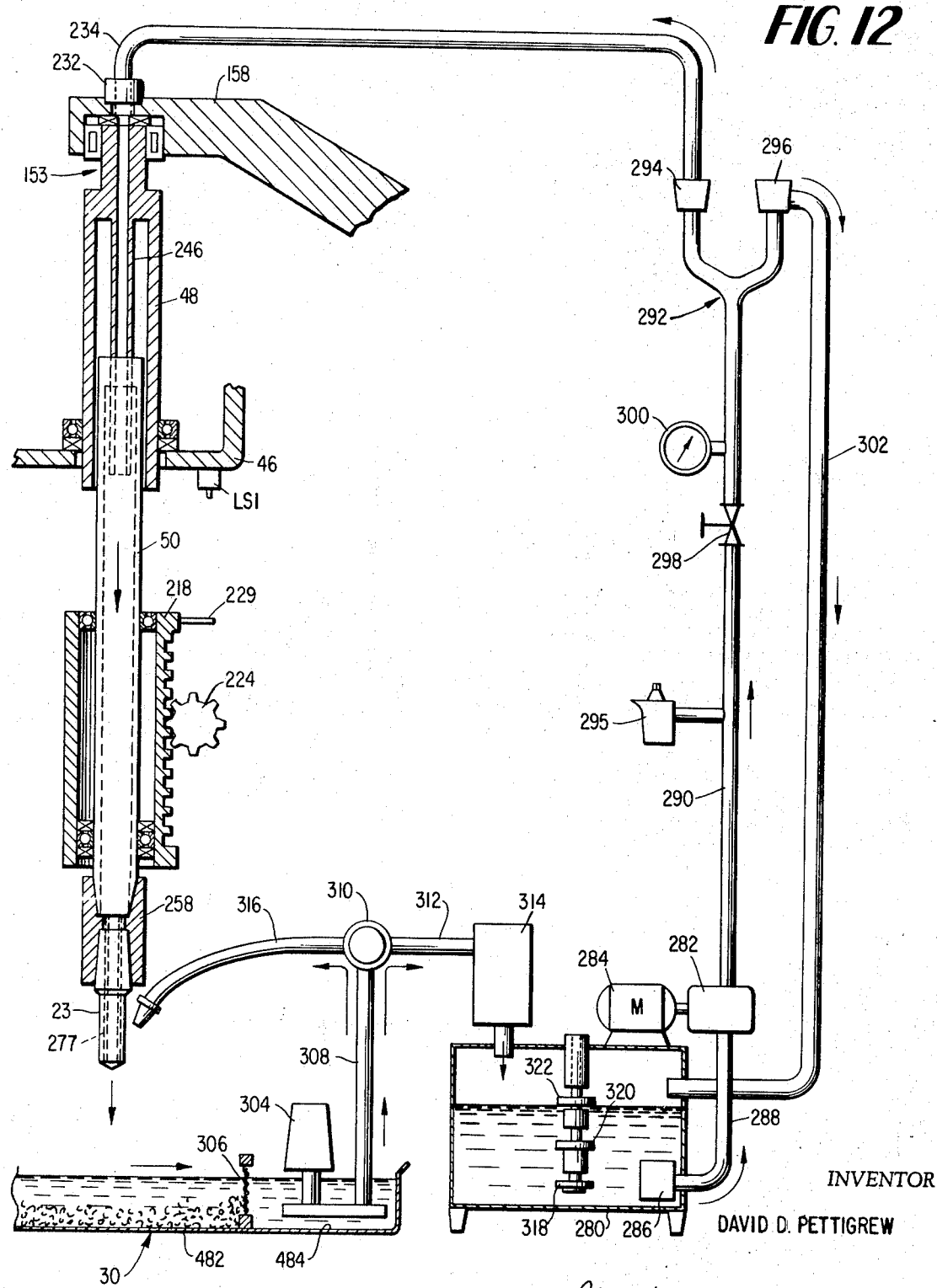
FIG. 12 is a schematic illustration of the high pressure oil coolant system which provides coolant oil to the upper end of the two-piece spindle structure and the drill attached thereto during a coolant hole drilling process.

The coolant system will now be described with particular reference to FIGS. 2–4 and the schematic diagram of FIG. 12. The system includes a closed oil holding supply tank 280 mounted behind machine 20 and a high pressure pump 282 having a capacity of 5 g.p.m. at 500 p.s.i. with its motor 284 mounted on top of the tank. Pump 282 draws oil from the tank through filter screen 286 and conduit 288 and pumps it continuously through conduit 290 to a T-connection 292. One leg of the T is connected through a solenoid operated valve 294 to conduit through which the oil is delivered to inductor 232 and spindle 48 during an oil-hole drilling operation. A relief valve 295 sets the maximum pressure in conduit 290, a manually operated flow control 298 adjusts the flow, and a pressure gage 300 indicates the pressure of the coolant flowing to the spindle. Valve 298 and gage 300 are conveniently located on the control panel 41 for ready access to the operator.

The other leg of T-connection 292 is connected through a solenoid operated valve 296 to a return conduit 302 which dumps the fluid back into tank 280.

As will be described in detail later, during operation, only one of the solenoid operated valves 294 and 296 will be open at one time, depending upon whether spindle 50 is in its raised non-drilling position in which arm 229 engages limit switch LSI or in a lower drilling position. With spindle 50 in its raised position, valve 294 is closed and valve 296 is open to dump the oil from pump 282 back into tank 280. When spindle 50 is in a lower drilling position, valve 296 is closed and valve 294 is open to deliver a continuous flow of coolant to the spindle. This valve arrangement ensures that coolant is delivered to the spindle only when a drilling operation is in effect.

Figure 15:
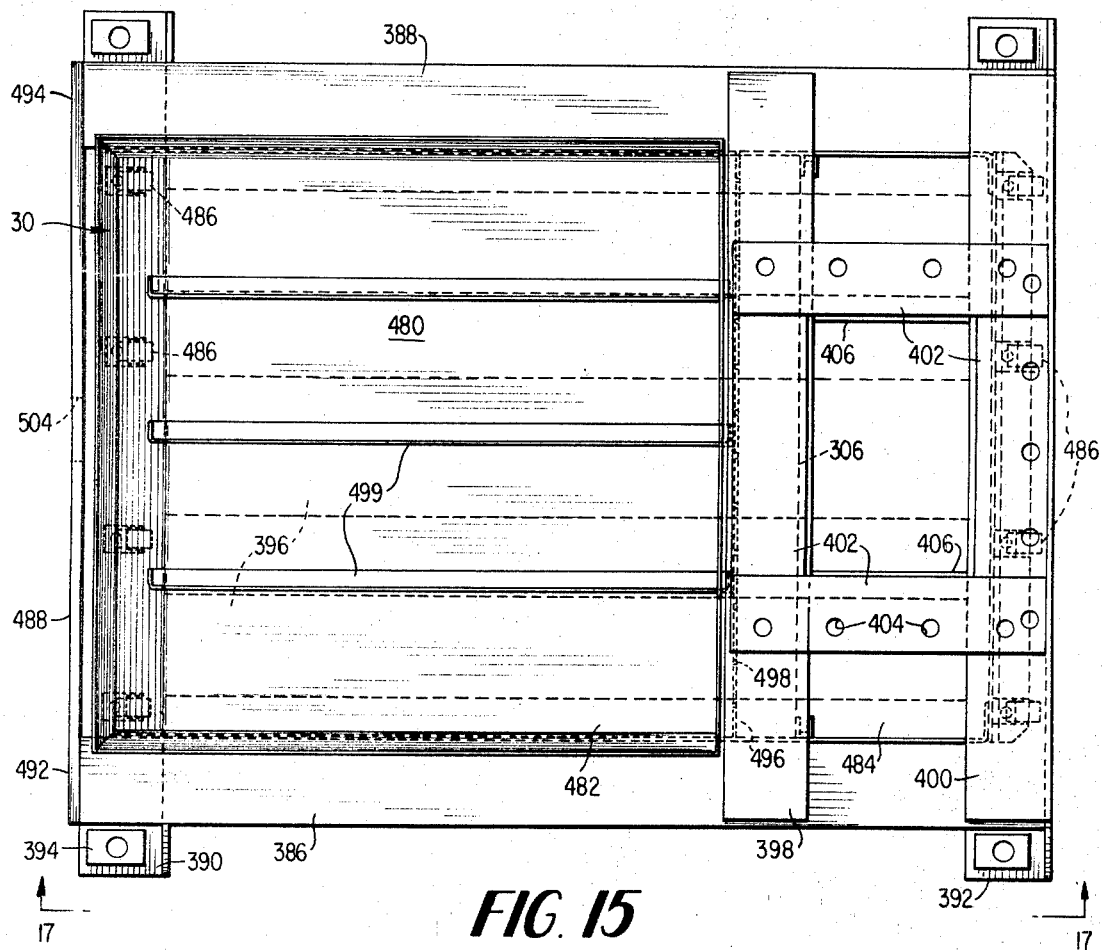
FIG. 15 is a top plan view of the base and chip pan assembly shown in FIG. 14.
Figure 14:
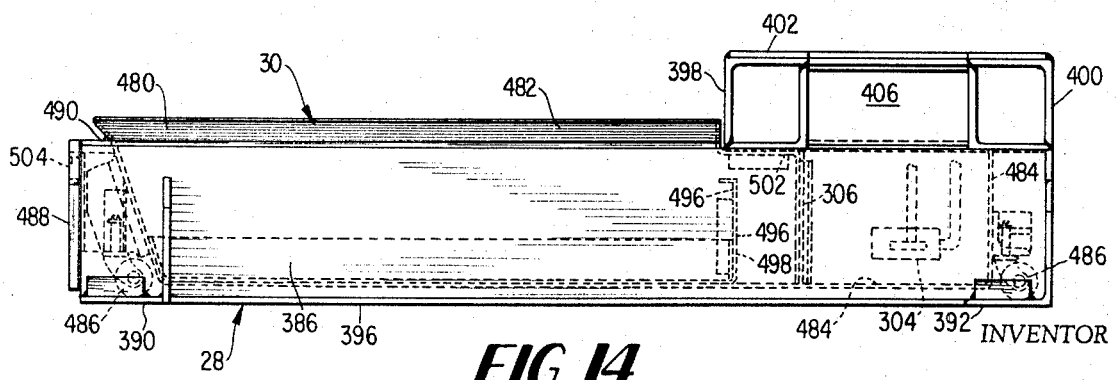
FIG. 14 is a side elevation view of the base and removable chip pan assembly taken along line 14—14 of FIG. 6.

The high pressure coolant which passes out through drill 23 is confined by the splash enclosure 36 and collected in the chip pan assembly 30 (see FIGS. 14 and 15). A sump pump 304 is pivotally supported at the bottom of column structure 24 with its intake positioned within the rear portion of pan assembly 30. Pump 304 draws the spent collected oil through a filter screen 306 and pumps it through conduit 308 to a two-way manual valve 310 which is located on control panel 41. During an oil-hole drilling operation, valve 310 is positioned to pass the oil through conduit 312 and filter 314 back into the top tank 280. During conventional flood drilling, valve 310 may be positioned to pass the coolant from conduit 308 to a conventional flood coolant line 316 onto the workpiece being drilled.

During an oil hole drilling process, operation of the machine and sump pump 304 are controlled by three float controlled switches 318, 320, and 322 positioned in tank 280. The lowermost switch 318 prevents operation of the machine when the oil supply in tank 280 is dangerously low. Switches 320 and 322 turn the sump pump 304 on and off, respectively, to maintain the oil supply in tank 280 at an adequate level.

THE VARIABLE RATE QUILL FEED SYSTEM

The variable rate feed system for reciprocating the quill 218 and lower spindle 50 vertically to feed drill 23 into the workpiece is shown schematically in FIG. 13 and includes the split helical gear pinion 224 rotatably mounted within spindle head 44 and a pair of hydraulically operated feed cylinders 324 and 326 which rotate pinion 224 engaging helical rack 222 to drive the quill up and down.

Figure 13A:
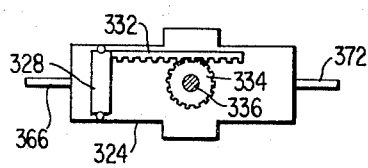
FIG. 13A is a fragmentary schematic illustration of one of the feed cylinders as it would appear in side elevation on the machine.

Feed cylinders 324 and 326, shown in plan view in FIG. 13, are mounted horizontally on opposite sides of drill head 44 and include pistons 328 and 330, respectively. As illustrated in FIGS. 13 and 13A, each piston includes a rod 332 formed as a gear rack which drives a pinion 334 formed on a shaft 336 rotatably mounted in the housing of each of the cylinders. One end 338 of each shaft 336 extends laterally from its respective cylinder and is drive coupled to pinion 224 to rotate the pinion as pistons 328 and 330 are reciprocated.

Figure 4:
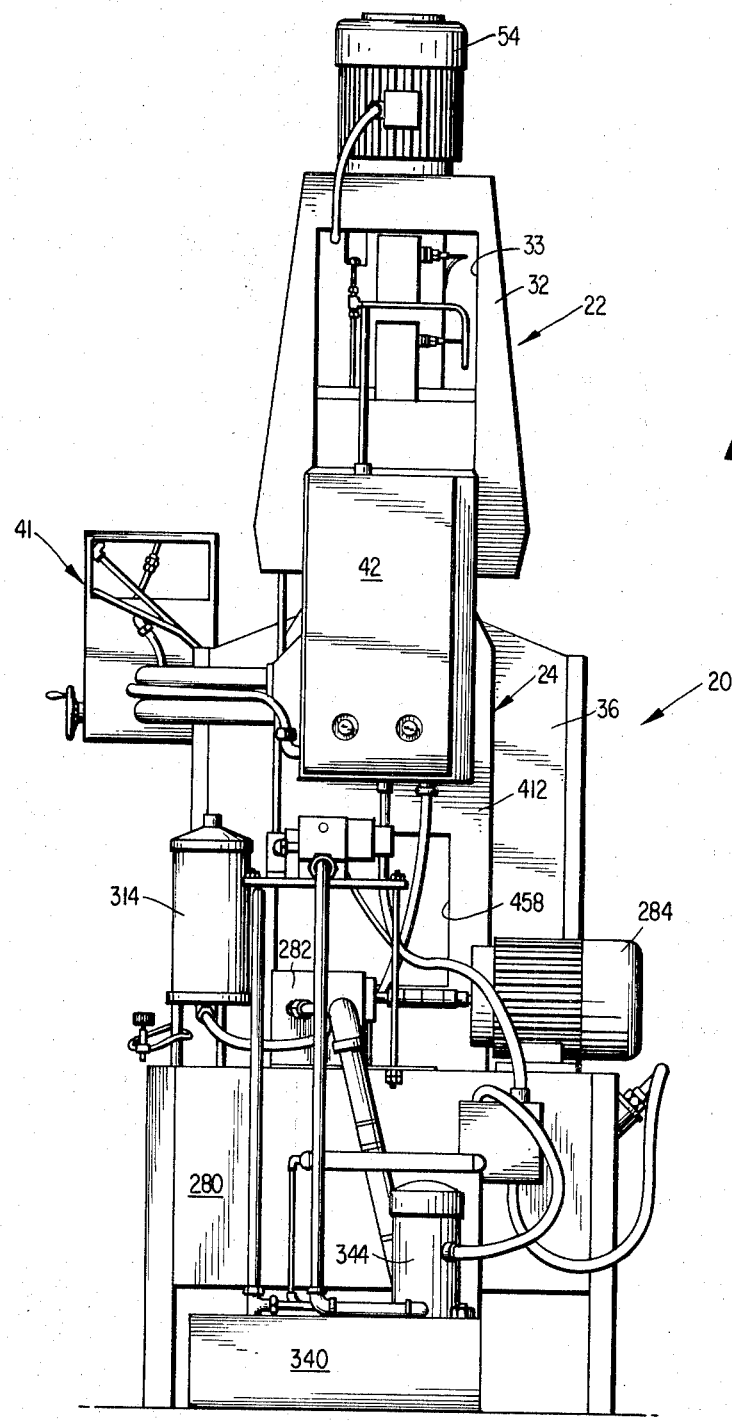
FIG. 4 is a rear elevation view of the drill press of FIG. 1.

The hydraulic circuit for operating cylinders 324 and 326 includes an oil supply tank 340 mounted behind machine 20 (see FIG. 4). A 4 g.p.m. pump 342 driven by motor 344 draws fluid from tank 340 through conduit 346 and filter 348 and pumps it to a T-connection 350, one leg of which is connected to a pressure relief valve 352 ordinarily set at about 375 p.s.i. and adapted to dump fluid back into the tank when this pressure is exceeded.

The other leg of T-connection 350 connects to a conduit 354 which leads to a solenoid operated spool valve 356 by way of conduit 358 and filter 360. Valve 356 is normally spring biased to a neutral closed position shown in FIG. 13. Line 354 is also connected to an adjustable pressure relief valve 362 normally set at about 200 p.s.i. to dump fluid back into tank 340 when that pressure is exceeded.

In FIG. 13, valve 356 is shown in its deenergized neutral closed position in which no fluid will pass through the valve to cylinders 324 and 326. Fluid will merely be circulating from pump 42 through the neutral chamber of the spool valve and back to the tank 340. If the valve is moved to the right so that the "quill feed or down" valve section A is placed in the fluid circuit, fluid is delivered through conduits 364 and 366 to one spindle-feed end of cylinders 324 and 326. A branch conduit 368 from conduit 364 leads to a pilot fluid actuator 369 for opening a back flow control check valve 370 when fluid is conducted through conduit 364. This exhausts the fluid from the other spindle-retract end of the cylinders by way of conduits 372 and 374, a two-way valve 376 positioned as shown in full with fluid passing between ports X and Z, conduit 378, opened valve 370, a pressure compensated, adjustable flow control throttling valve 380, and conduit 382 through section A of valve 356 back into tank 340.

As pistons 328 and 330 are moved forwardly, helical pinion 224 is rotated to move quill 218 and spindle 50 downwardly and thereby feed the drill into the workpiece. The rate of travel of the quill may be varied by adjusting the throttle valve 380 and relief valve 362.

In addition, the two position valve 376 enables the amount of thrust imparted to quill 218 and drill spindle 50 and the feed rate thereof to be adjusted. With valve 376 positioned as shown in full in FIG. 13 to pass fluid between ports X and Z and thereby cause both pistons 328 and 330 to drive pinion 224, the drill spindle may be fed into the workpiece at a feed rate of about 100 inches per minute (i.p.m.) with a thrust of about 3,000 pounds. If valve 376 is positioned to connect ports X and Y as shown in dotted line, fluid is merely circulated between opposite ends of cylinder 326. Consequently, the drill spindle is fed into the work at a higher feed rate of 200 i.p.m. but with a lower thrust of 1,500 pounds.

When the drilling operation is completed, spool valve 356 is moved to the left, placing valve section B in circuit, to reverse the direction of movement of pistons 328 and 330 and thereby cause the drill spindle 50 to be raised. To accomplish this, fluid is passed from conduit 358 through the "quill retract or up" valve section B, conduit 382, check valve 384 which bypasses control valve 380, directly through check valve 370, conduits 372 and 374 to the spindle-retract ends of cylinders 324 and 326. Fluid will exhaust from cylinders 324 and 326 through conduit 364 to tank 340 and pistons 328 and 330 will move rearwardly at a maximum rate. Consequently, quill 218 and spindle 50 will be retracted at the maximum rate permitted by the setting of valve 376.

Upon completion of a drilling operation, repositioning of spool valve 356 to reverse the direction of movement of quill 218 is preferably automatically controlled by a normally closed pressure sensitive switch PSI which opens when the fluid pressure in conduit 378 drops below a predetermined value indicative of the fact that stop member 228 has engaged the appropriate depth-of-cut stop rod 230 (FIG. 8B) and quill 218 can no longer be fed into the workpiece. This stops forward movement of pistons 328 and 330 and the fluid pressure in conduit 378 will decrease to open switch PSI to energize and move valve 356 to its reversing, quill retracting B position. The function of switch PSI is further described below with reference to FIG. 19.

It is appreciated, therefore, that the feed rate of the drill spindle into the workpiece may be varied within the range of 0–200 i.p.m., with a maximum thrust of 3,000 pounds at a feed rate of about 100 i.p.m., merely by selectively adjusting valves 376, 380 and 362.

THE BASE AND COLUMN SUPPORT STRUCTURE

Referring now to FIGS. 14 and 15, base section 28 is formed by a pair of spaced rearwardly extending hollow beams 386 and 388 each formed by a pair of facing angle irons welded together (see FIG. 6). The spaced beams 386 and 388 define a well within which chip pan assembly 30 is removably located. Flat plates 390 and 392 extend transversely across and are welded to the bottoms of beams 386, 388 at the front and rear ends beyond the side edges thereof to form corner mounting pads on which mounting blocks 394 are welded. Suitable bolts will pass through blocks 394 and plates 390 and 392 into a slab or floor support. A plurality of flat plates 396 also extend longitudinally between and are welded to plates 390 and 392.

A pair of spaced hollow transverse beams 398 and 400 extend across and are welded to the top of beams 386 and 388 at the rear portion thereof. As seen in FIG. 14, each hollow beam is formed by a pair of angle irons facing each other and welded together. A plurality of flat plates 402 are welded to the top surfaces of beams 398 and 400 to form a rectangular mounting pad for column structure 24. Three of the plates 402 include a number of tapped holes 404 by which the column is secured to the base. A pair of short, reinforcing angle irons 406 are welded between beams 398 and 400.

The column support structure 24 is a unique fabricated, rigid, hollow rectangular box-type weldment assembly specially designed to withstand the high thrust and torque loads which prevail while the drill is fed into hard materials such as alloy steels. As shown generally in FIGS. 5–7 and more specifically in FIGS. 16–18, the column structure includes a pair of spaced, web-facing side channel beams 408 and 410 and a back plate 412 weldedly connected to and extending between the back flanges of channels 408 and 410. The bottoms of channels 408 and 410 and back plate 412 rest on and are welded to integrally welded flange plates 414, 416 and 418 which are bolt connected to plates 402 of base section 28.

A pair of short inwardly angled channel pieces 420 and 422 are welded on the top of channels 408 and 410, respectively, and support a rectangular bar frame 423 on which the drill head 22 is mounted. Frame 423 (FIG. 16) is welded on the top of channel sections 420, 422 and back plate 412 and includes a rear bar 424 connecting side bars 426 and 428, the front ends of which extend beyond the front end flanges of channels 408 and 410 and are weldedly connected to front bars 430 and 432. As shown in FIGS. 5–7, the rear casing portion 43 of drill head 22 seats on and is fastened by a suitable number of bolts to bar frame 423.

The front upper end of column 24 is closed by a pair of side plates 434 and 436 welded to the front flanges of channels 408, 420, 410, and 422, respectively, and the underside of the forward ends of bars 426 and 428, a front plate 438 weldedly connecting plates 434 and 436 and the bottom of bar 430, and a bottom plate 440 welded to plates 434, 436, and 430 and channels 408 and 410.

A table support and guide assembly 441 includes a pair of spaced vertical angle irons 442 and 444 welded to the front flanges of channels 408 and 410. A channel member 446 is welded between angle irons 442 and 444 with its end flanges extending vertically downwardly from plate 440 and having machined bearing guide plates or ways 448 and 450 welded thereto, and hardened ways 448a and 450a bolted to plates 448 and 450. In order to strengthen the guide assembly, a pair of gusset plates 454 and 456 are welded between the web and end flanges of channel 446.

Figure 17:
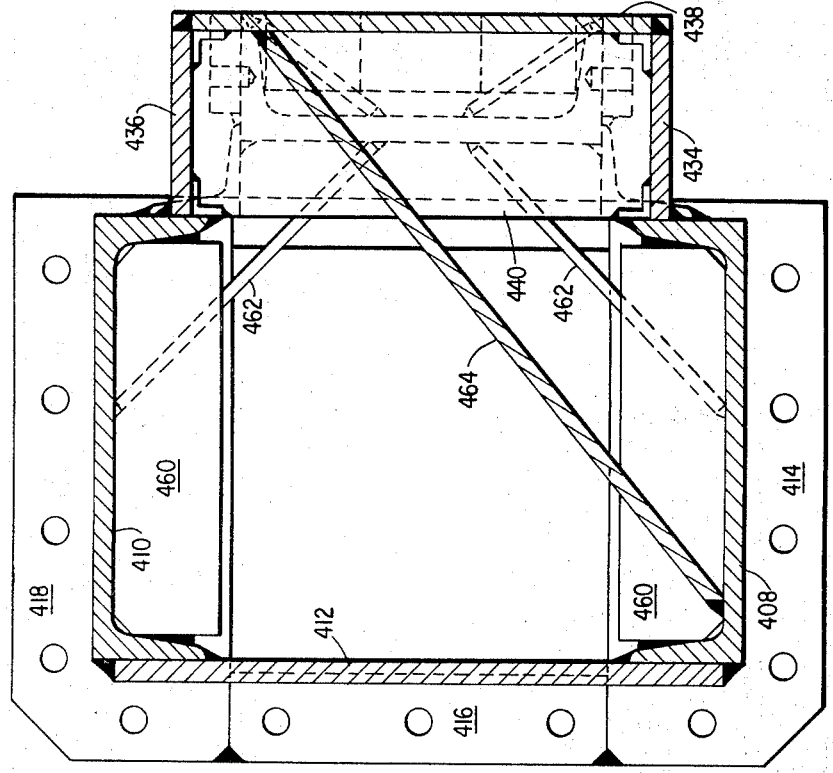
FIG. 17 is a sectional plan view of the column structure taken along line 17—17 of FIG. 7.
Figure 16:
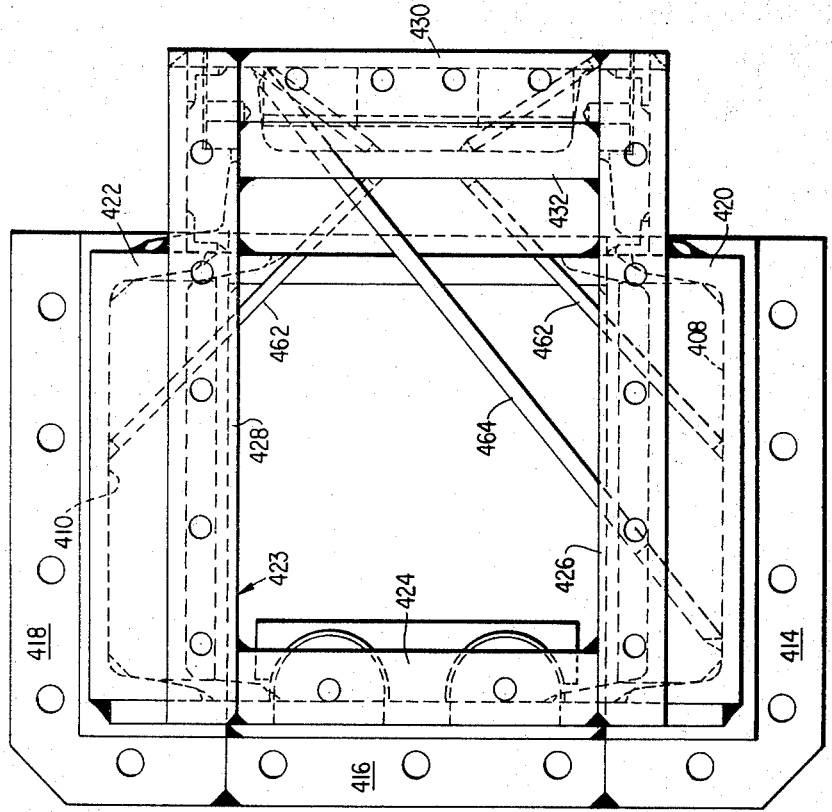
Fig. 16 is a sectional plan view of the column support structure taken along line 16—16 of FIG. 7.

As shown in FIG. 4, back plate 412 has a cut-out opening 458 which is needed to provide access to machine components mounted within column 24, such as the sump pump 304 which is pivotally mounted within the lower end of the column for submersion in the oil collected in pan assembly 30. The cut-out 458 tends to weaken the column by making it too flexible in torsion. To compensate for this cut-out and reinforce the overall column structure, a plurality of vertically spaced horizontal plates 460 is welded within the web portion of each channel 408, 410 and a plurality of vertically spaced gusset plates 462 is welded between the web of each channel 408 and 410 and the guide channel member 446. In addition, as shown in FIGS. 16 and 17, a gusset plate 464 weldedly extends between channel 408 and plate 438.

The various reinforcing and gusset plates function to rigidify column structure 24 and enable it to withstand the high torsion loads created during a drilling operation.

In developing the column structure for the machine, it was determined that the total deflection in the "C" shaped design formed by head 22, column 24, and table 26 should not exceed 0.0005 inch in any direction under maximum design loads of 2,000 pounds thrust and 1,850-inch pounds torque. A structural analysis of column 24 predicted a maximum deflection of less than one-fourth the specified maximum deflection, and operation of the prototype machine has proved the column structure to be adequate.

As best shown in FIG. 18, table assembly 26 has a bracket or knee 466 for supporting the removable horizontal table 27. Bracket 466 includes a pair of elongated machined vertical ways 468 and 470 which slidably engage ways 448a and 450a to permit vertical adjustment of the table relative to spindle head 44. A massive reinforcing web structure 467 extends between ways 468 and 470 and table 27 and maintains a rigid right angle relationship between the ways and table, thereby maintaining the horizontal position of the table relative to the drill under the heavy duty operating conditions of the machine. Vertical adjustment is accomplished by a feed screw 768 (FIG. 5) fixed within channel 446 and an adjusting feed nut 770 rotatably mounted within a housing 472 of bracket 466 for threading rotation on screw 768. Nut 770 has an outer helical gear segment driven by a pinion 474 mounted on the inner end of a shaft 475 which is rotated by hand lever 476. Rotation of pinion 474 will cause nut 770 to rotate in housing 472 and thread up and down on screw 768 and thereby adjust table 26 to a desired height.

THE CHIP PAN ASSEMBLY

Referring again to FIGS. 5–7 and 14 and 15, the chip pan assembly 30 fits within but is removable from base section 28. Assembly 30 includes a chip pan 480 having a front portion 482 disposed underneath table 26 and a rear portion 484 positioned beneath transverse base members 398 and 400. The pan has a plurality of front and rear casters 486 by which it may be rolled to and from its operative position within the base. A plate 488 is welded at 490 to the front of pan 480 and has end flanges 492 and 494 which abut the ends of beams 386 and 388, the plate 488 closing the front end of the base section when assembly 30 is positioned therein.

A transverse plate 496 extends across pan 482 at the juncture of front and rear portions 482 and 484 and serves to confine the collected chips within front portion 482. Plate 496 has a plurality of openings 498 through which the spent coolant passes from the front portion 482 to the rear portion 484. The coolant may also pass over to the top of plate 496. A plurality of spacers 499 are mounted in the bottom of pan portion 482 to reinforce the pan and equally distribute the spent coolant and chips therein. The changeable filter 306 is mounted by a bracket 502 behind plate 496 and functions to filter the spent coolant as it passes to sump pump 304 (see FIG. 12). A slot 504 in front plate 488 enables an operator to manually grasp the pan assembly 30 and, after sump pump 304 has been pivoted away, remove it from the base for clean-out purposes.

OPERATION

Operation of the machine will now be described as it operates to perform an oil-hole drilling process, with particular reference being made to the electrical control diagram illustrated in FIG. 19.

Initially, a desired speed of rotation for the two-piece spindle is selected by adjustment of the diameters of pulleys 60 and 110 and the positioning of the speed range mechanism (FIGS. 8A, 8B, 9, 10, and 11) in one of its three possible positions. With table 26 set at a predetermined height, the depth of hole to be drilled is then set by adjustment of sleeve 220 to position a selected stop rod 230 in the path of travel of stop member 228 (FIG. 8B). The rate of feed of spindle 50 and the drill attached thereto is selected by adjustment of valves 362, 376, and 380 (FIG. 13). Also, the valve 310 in the coolant circuit of FIG. 12 will be positioned to permit flow of spent oil from pan assembly 30 to tank 280. The front doors 38 of splash housing 36 will be closed.

The control circuit of FIG. 19 includes a pair of main lead lines L1 and L2 which are powered from a suitable electrical source 510. A manual switch 512 will be moved to its "On" position to energize relay R1 and close normally open contacts R1–1, thereby lighting the mercury lamp 514 located within splash housing 36, and close normally open contacts R1–2 to supply current to the remainder of the circuit.

During normal operation, quill 218 will start in its uppermost raised position with actuator arm 229 engaging limit switch LS1 so that contact LS1–1 is closed to light a green indicator light 516 and contact LS1–2 is open and the splash doors 38 will be closed so that limit switch LS2 is open as shown in FIG. 18. The pushbutton emergency "Stop" switch PB1 and the protective motor overload switches OL54, OL284, and OL304 for motors 54, 234, and 304, respectively, will all be closed.

A three position mode selector switch SS1 will be moved to its "O.H." (oil hole drilling) position to establish a circuit from line 518 to line 520 through a closed switch contact 522. In each of the positions "O.H." and "F" (flood) of switch SS1, the contacts labelled "X" will be closed.

Similarly, a three position feed selector switch SS2 will be positioned in its "A" (Automatic) position so that the hydraulic feed system of FIG. 13 will be operable, as shown by a yellow indicator light 524, and the direction of travel of the spindle will be reversed automatically when the hole is drilled. In each of the "A" and "J" (Jog) positions of switch SS2, the switch contacts labelled "X" will be closed to energize the various solenoids and motors of the feed circuit in a desired manner. In the "Off" position of switch SS2, the feed system will not operate.

To start an oil-hole drilling operation, "Start" button PB2 is depressed to pass current from line L1 through normally closed switches PB1, OL54, OL284, normally closed contacts R5–2, contacts R2–1 which are closed if the fluid level in tank 280 is above float switch 318, normally closed contacts R4–1, switches OL304, line 518 to junction 519, starter S54 for spindle motor 54, and contacts R3–1, which are closed if tank 280 is filled as sensed by float switch 322 to line L2. Motor 54 will be started and contacts S54–1, S54–2, and S54–3 will be closed to establish a holding running circuit for the motor independent of pushbutton PB2.

Current will also flow from junction 519 through starter S284 for coolant motor 284 and contacts R3–2, which are closed if tank 280 is filled, to line L2, thereby starting motor 284 and closing contact S284–1. Similarly, current will flow through line 526 and switch SS2 to starter S344 for starting the feed pump motor 344.

As indicated, the above operation will occur only if the level of the fluid in tank 280 is sufficient to close the contacts of float switches 318, 320, and 322 and thereby energize relay R2 to close the normally open contacts R2–1 and deenergize relay R3 to keep contacts R3–1 and R3–2 closed. If relay R2 is not energized and starting of the machine is prohibited, a red emergency indicator light 528 will be lit through normally closed contacts R2–2, thus warning the operator that the coolant supply in tank 280 is dangerously low.

However, if the coolant level in tank 280 is high enough to close switch 318 but still is below the filled level as sensed by float switch 322 which therefore will be closed to energize relay R3, motors 54 and 284 will not start since the normally closed contacts R3–1 and R3–2 will be open. Normally open contacts R3–3 will close to energize starter S304 for sump pump 304 and thereby fill tank 280 until float switch 322 is opened. This operation insures that initially the machine must start with tank 280 filled.

When tank 280 is thus filled, the above described starting operation is permitted and thereafter normally open contacts R2–3 will be closed to place operation of starter S304 for sump pump 304 under control of float switches 320 and 322. If the coolant level goes below the setting of float switch 320, the switch will be closed to energize relay R3 which closes normally open contacts R3–3 to energize starter S304 and motor 304 and light a blue "Sump-on" indicator light 530. Energization of relay R3 also closes normally open contacts R3–4 to then place motor 304 under control of float switch 322 which remains closed until the coolant level in tank 280 is again raised to the filled setting of switch 322, which then opens to deenergize relay R3, open R3–3 and R3–4 and thereby deenergize starter S304 and sump pump motor 304. Periodic operation of the sump pump is controlled in this manner throughout an oil-hole drilling operation.

The "Down" pushbutton PB3 is then depressed to feed quill 218 and the rotating drill 23 into the workpiece. Depression of button PB3 passes current from line 532 through closed contact PB3–2 and the normally closed contacts PB4–2 of "Up" button PB4 to energize relay R6 which opens normally closed contacts R6–1 and closes normally open contacts R6–2. Closure of contacts R6–2 passes current from line 532 through normally closed pressure switch PS1 to establish a holding circuit for relay R6 via lines 533 and energize the "Down" solenoid 534 which moves spool valve 356 (FIG. 13) to its "A" or "Quill Down" position. The feed pistons 328 and 330 are then pushed forwardly to rotate pinion 224 and drive the quill 218, spindle 50 and drill down into the workpiece at a thrust and penetration rate determined by the setting of valves 362, 376, and 380.

As quill 218 moves down, actuator arm 229 will disengage limit switch LS1 to open contact LS1–1 and close contacts LS1–2, the latter causing energization of relay R5 to close contacts R5–1, R5–3 and R5–4 and open contacts R5–2. Closure of contacts R5–1 will energize solenoids 536 and 538 which actuate valves 294 and 296, respectively, (FIG. 12) to open and close positions so that the high pressure coolant oil is delivered to the drill spindle 48 and drill tip.

Downward movement of quill 218 and drilling of the hole will continue until stop 228 engages the selected stop rod 230 at which time the quill can no longer move downwardly. Consequently, feed pistons 328 and 330 cannot move forwardly and the fluid pressure in conduit 378 (FIG. 13) will lower below the setting of pressure sensing switch PS1, the contacts of which will open to deenergize relay R6 and the "Down" solenoid 534, the latter causing spool valve 356 to be spring biased back to its neutral position. Deenergization of relay R6 causes contacts R6–1 to close and contact R6–2 to open, with closure of contact R6–1 causing current to pass through closed contacts R5–3 and R5–4 and thereby energize "up" solenoid 540 which moves spool valve 356 to its "B" or "Quill Up" position. Pistons 328 and 330 will be actuated in a rearward direction to move quill 218 upwardly and remove the drill from the workpiece. When the quill is fully raised, actuator 229 will again engage limit switch LS1 to close contacts LS1–1 and open contact LS1–2. Opening of contact LS1–2 causes deenergization of relay R5 to open contact R5–1 and deenergize solenoids 536 and 538 and close and open valves 294 and 296, respectively, to discontinue flow of the coolant to the spindle and dump it back into tank 280. Contacts R5–2 will close and contacts R5–3 and R5–4 will open.

It should be noted that the control system has several built-in safety features which prevent operation of the machine unless certain conditions are satisfied. The safety functions of float switches 318, 320, and 322 have already been described. In addition, before the machine can be started, quill 218 must be in its upper most raised position in which actuator 229 engages limit switch LS1 to close contact LS1–1 and open contacts LS1–2. If the quill is not raised, relay R5 will be energized through closed contact LS1–2 and, therefore, contacts R5–2 will be open to prevent current from flowing to junction 517. The presence of limit switch LS1 also ensures that when quill 218 and spindle 50 are fully raised to a non-drilling position and contact R5–1 is open, no coolant is supplied to the spindle.

Similarly, if the shower curtains 38 are open, limit switch LS2 will be closed to supply energizing current to relay R4 as soon as the quill starts to move down and contacts R5–1 are closed, with energization of relay R4 causing normally closed contacts R4–1 to open and thereby stop operation of the machine. Without the presence of limit switch LS2, an operator may be subjected to the danger and inconvenience of splashing coolant and chips should the curtain 38 be left open inadvertently.

Several additional manual control elements are embodied in the control circuit. A pushbutton PB5 bypasses the control contacts R5–1 and permits an operator to manually energize solenoids 536 and 538 and thereby direct the high pressure coolant to the spindle when it is in its raised nondrilling position for the purpose of checking the pressure of the coolant.

Another manual pushbutton PB6 overrides the control function of float switches 318, 320, and 322 and enables an operator to keep the sump pump 304 running as long as desired. Thus, the operator can fill the holding tank 280 to start up the machine and he can get all of the coolant out of the chip pan assembly 30 before removing the assembly to clean out the chips.

As already mentioned, the machine may also be operated as a conventional "Dry" drilling machine and with "Flood" coolant if desired. The dry drilling is accomplished by positioning switch SS1 in its "D" position so that no contacts are made through the switch to line 520 or to starter S304 for sump pump 304. With tank 280 filled, sump pump 304 will remain inoperative.

By moving switch SS1 to its "F" (flood) position, starter S304 will be energized to run sump pump 304 and, by properly positioning valve 310. Flood coolant will be supplied through flood conduit 316 (FIG. 12).

Switch SS2 may also be positioned in its "J" position to enable an operator to manually jog or intermittently move the quill 218 and spindle 50 up or down. To jog down, the operator merely depresses button PB3 to energize solenoid 534 through contacts PB3–1 and 542 and relay R6 through contacts PB3–2. Release of button PB3 stops movement of the quill.

Of course, if switch SS2 is in the "Off" position, no contacts are made through the switch and the hydraulic feed system is inoperative.

The various manually operated switches and indicator lights shown in FIG. 19 are conveniently located on the control panel 41 for ready access to the operator. These include switches 512, PB1 through PB6, SS1 and SS2, and indicator lights 516, 524, 528, and 530.

As indicated previously, a prototype machine has been constructed according to the invention and an extensive program of tests on various type metals is in progress. Some of these tests have been completed and clearly demonstrate the improved performance of the prototype machine over conventional dry drilling machines and known available oil-hole drilling machines.

For example, the penetration rates attained with the prototype machine have been approximateliy 300 to 700 percent higher than rates attained with conventional drilling equipment and 100 to 200 percent higher than rates with available coolant hole drilling equipment, depending upon the material tested.

Extensive tests in two rough steels, tempered AISI–1045 and AISI—4340 alloy steel, have demonstrated that penetration rates of 15 and 12 inches per minutes, respectively, can be obtained with acceptable tool life. These rates represent improvements of about 350 percent over conventional drilling practice and about 150 percent over current coolant hole drilling practice. Tests in softer steels have shown even larger improvements, 30 i.p.m. in AISI–1213.

Tests in structural and aircraft aluminum indicate that pentration rates at 70 inches per minute pentration should be obtainable with acceptable tool life with the prototype machine. This is an improvement of 700 percent over conventional drilling practice and 300 percent over current coolant hole drilling practice. Preliminary tests in gray cast iron indicate that the rate of 40 inches per minute should be obtainable representing a percentage of improvement about equal to that for aluminum.

Various modifications and additions may be incorporated in and are included within the scope of the invention. For example, an indexing turret may be included and automatically operated through suitable valving from the hydraulic feed supply circuit of FIG. 13. Since table 26 is removable from bracket 466, a number of different tables may be used with the machine.

The invention may be embodied in other specific forms without departing from the spirit or essetnial characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Drilling apparatus comprising a rigid frame, workpiece support table means, a spindle support head fixed to said frame above said table means, spindle means mounted on said support head for rotation about a vertical axis and for vertical reciprocation with respect to said support head, said spindle means rotatably and reciprocably mounting an oil-hole drill on said support head above said table means and including cooling passages for supplying coolant to said drill, shiftable variable speed drive means mounted on said frame and connected to said spindle means for rotating said drill within a wide speed range, shiftable variable rate feed means mounted on said frame and connected to said spindle means for vertically reciprocating said drill toward and away from a workpiece on said table means at a selected correlated rate within a wide feed-rate range to attain an optimum cutting rate for the metal of the workpiece, coolant fluid supply means connected to said spindle means for delivering coolant fluid through said spindle means to said drill during a coolant-hole drilling operation, coolant fluid collection means positioned beneath said table means, and means for delivering spent coolant fluid from said collection means back to said supply means.

2. Drilling apparatus comprising a rigid frame, workpiece support table means, spindle means for rotatably and reciprocably mounting an oil-hole drill on said frame above said table means and including cooling passages for supplying coolant to said drill, variable speed drive means connected to said spindle means for rotating said drill within a wide speed range, variable rate feed means connected to said spindle means for reciprocating said drill toward and away from a workpiece on said table means at a selected correlated rate within a wide feed-rate range to attain a maximum cutting rate for the metal of the workpiece, and coolant fluid supply means connected to said spindle means for delivering coolant fluid through said spindle means to said drill during a coolant-hole drilling operation, said coolant fluid supply means including a fluid supply tank, pump means for withdrawing fluid from said tank, conduit means including selectively positionable valve means connecting the outlet of said pump means to said spindle means or back to said tank, said valve means being automatically positioned in response to a drilling or non-drilling position of said spindle means to prevent coolant fluid from passing to said spindle means when it is in a non-drilling position.

3. Drilling apparatus as defined in claim 2, said frame comprising a base having a chip pan assembly in which chips and spent coolant fluid are collected, said coolant fluid supply means including a sump pump mounted in said chip pan assembly and second conduit means connecting said sump pump to said supply tank for recirculating coolant fluid from said chip pan assembly back to said tank .

4. Drilling apparatus as defined in claim 3, comprising filter means in said chip pan assembly for filtering the spent coolant fluid before it is pumped back to said tank.

5. Drilling apparatus as defined in claim 3, said coolant fluid supply means comprising a plurality of float operated switches positioned at various levels in said tank, said switches controlling operation of said sump pump in response to the fluid level in said tank.

6. Drilling apparatus as defined in claim 3, said second conduit means including a flood conduit and a tank return conduit, and a valve positionable to fluid connect said flood or tank return conduits with said sump pump, thereby providing either a flood coolant or coolant-hole drilling operation as desired.

7. Drilling apparatus as defined in claim 3, comprising an enclosure substantially surrounding said table means and extending vertically between said spindle means and said base, whereby the work area of said drill is substantially completely enclosed and the chips and spent coolant fluid are confined within said enclosure and collected within said chip pan assembly.

8. Drilling apparatus as defined in claim 7, said enclosure having openable access means, and switch means responsive to the open condition of said access means to prevent operation of said apparatus.

9. Drilling apparatus comprising a rigid frame including a drill head, workpiece support table means, spindle means for rotatably and reciprocably mounting an oil-hole drill on said frame above said table means, said spindle means being a two-piece spindle structure comprising an upper hollow spindle rotatably, non-reciprocably mounted on said drill head and a lower spindle the upper portion of which is reciprocable within said upper spindle and rotatable therewith, a quill reciprocably mounted on said drill head, the lower portion of said lower spindle rotatably received within said quill and reciprocable therewith, variable speed drive means connected to said upper spindle means for rotating said drill within a wide speed range, variable rate feed means connected to said quill for reciprocating said quill, said lower spindle and said drill toward and away from a workpiece on said table means at a selected correlated rate within a wide feed-rate range to attain a maximum cutting rate for the metal of the workpiece, said upper and lower spindles having longitudinally extending fluid passageways through which coolant fluid is delivered to the drill, and coolant fluid supply means including inductor means connected to the upper end of said upper spindle for delivering coolant fluid through said spindle means to said drill during a coolant-hole drilling operation.

10. Drilling apparatus as defined in claim 9, said upper hollow spindle having a fluid fitting received in its upper end, said fitting including an outer shaft section rotatably connected to said inductor means and having a longitudinal fluid passageway therethrough which communicates with an elongated tubular member connected to said fitting and positioned within said upper spindle, said lower spindle having its upper end slidably surrounding said tubular member, whereby coolant fluid introduced into said inductor means passes through said fitting and tubular member into the passageway of said lower spindle and down to said drill.

11. Drilling apparatus as defined in claim 9, said drill head comprising upper and lower head sections, said upper spindle being rotatably mounted in said upper section and said quill being reciprocably mounted in said lower section, a depth-of-cut adjustment sleeve rotatably, non-reciprocably mounted in said lower section adjacent said quill and having a plurality of upwardly extending stop rods of different lengths, said quill having a lateral projection at its upper end for engaging a selected one of said stop rods as said quill moves downwardly, whereby the depth-of-cut of the hole to be drilled may be varied by adjusting said sleeve until a selected one of said stop rods is positioned for abutment with said lateral projection.

12. Drilling apparatus as defined in claim 9, said lower spindle having a tool chuck mounted on its lower end, said tool chuck having a drill bit socket, an annular fluid chamber communicating with the fluid passageway in said lower spindle, whereby during operation coolant fluid is conducted from said spindle passageway through said fluid passage means and annular chamber to a coolant-hole drill retained in said socket.

13. Drilling apparatus as defined in claim 12, said chuck socket conforming to standard Morse tapers.

14. In a coolant hole drill press, reciprocable spindle means having a coolant passageway extending axially therethrough and adapted to deliver coolant fluid to a drill mounted on the lower end of said spindle means, a coolant fluid supply system including a fluid supply tank, pump means for withdrawing fluid from said tank, conduit means including selectively positionable valve means connecting the outlet of said pump means to the upper end of said spindle means or back to said tank, said valve means being automatically positioned in response to a drilling or non-drilling position of said spindle means to prevent coolant fluid from passing to said spindle means when it is in a non-drilling position.

15. In a coolant hole drill press as defined in claim 14, a base underlying said spindle means and having a chip pan assembly in which chips and spent coolant fluid are collected, said coolant fluid supply system including a sump pump mounted in said chip pan assembly and second conduit means connecting said sump pump to said supply tank for recirculating coolant fluid from said chip pan assembly back to said tank.

16. In a coolant hole drill press as defined in claim 15, said chip pan assembly including a chip receiving pan and filter means mounted therein for filtering the spent coolant fluid before it is pumped back to said tank.

17. In a coolant hole drill press as defined in claim 15, said coolant fluid supply system comprising a plurality of float operated switches positioned at various levels in said fluid supply tank, said switches controlling operation of said sump pump in response to the fluid level in said tank.

18. In a coolant hole drill press as defined in claim 15, said second conduit means including a flood conduit and a tank return conduit, and a valve positioned to fluid connect said flood or tank return conduit with said sump pump, thereby providing either a flood coolant or coolant hole drilling operation as desired.

19. In a coolant hole drill press as defined in claim 14, a drill support head, said spindle means being a two-piece spindle structure comprising an upper hollow spindle rotatably, non-reciprocably mounted on said drill head and a lower spindle the upper portion of which is reciprocable within said upper spindle and rotatable therewith, a quill reciprocably mounted on said drill head, the lower portion of said lower spindle rotatably received within said quill and reciprocable therewith, said upper and lower spindles having communicating axially extending passageways through which coolant fluid is delivered to a drill, and said coolant fluid supply system including inductor means connected to the upper end of said upper spindle for delivering coolant fluid thereto.

20. In a coolant hole drill press as defined in claim 19, said upper hollow spindle having a fluid fitting received in its upper end, said fitting including an outer shaft section rotatably connected to said inductor means and having a longitudinal fluid passageway therethrough which communicates with an elongated tubular member connected to said fitting and positioned within said upper spindle, said lower spindle having its upper end slidably surrounding said tubular member, whereby coolant fluid introduced into said inductor means passes through said fitting and tubular member into the passageway of said lower spindle and down to said drill.

21. In a coolant hole drill press as defined in claim 19, said drill head comprising upper and lower head sections, said upper spindle being rotatably mounted in said upper section and said quill being reciprocably mounted in said lower section, a depth-of-cut adjustment sleeve rotatably, nonreciprocably mounted in said lower section adjacent said quill and having a plurality of upwardly extending stop rods of different lengths, said quill having a lateral projection at its upper end for engaging a selected one of said stop rods as said quill moves downwardly, whereby the depth of the hole to be drilled may be varied by adjusting said sleeve until a selected one of said stop rods is positioned for abutment with said lateral projection.

22. In a coolant hole drill press as defined in claim 19, said lower spindle having a tool chuck mounted on its lower end, said tool chuck having a drill bit socket, an annular fluid chamber communicating with said socket, and axially extending fluid passage means communicating with the fluid passageway in said lower spindle, whereby during operation coolant fluid is conducted from said spindle passageway through said fluid passage means and annular chamber to a coolant hole drill retained in said socket.

23. In a coolant hole drill press as defined in claim 22, said chuck socket conforming to standard Morse tapers.

24. A high speed, true-hole, drill press for production use on difficult-to-drill metal workpieces comprising a frame structure comprising a fabricated metal crow-foot base and a fabricated metal column rising from the apex of said craw-foot base and providing a forwardly projecting spindle support arm laterally centered with and spaced above said crow-foot base to define a rigid, non-yielding C frame, said spindle support arm having a vertical through bore therein to mount and support a drill spindle means; a pair of machined table ways fixedly mounted on said column at its forwardly disposed corners extending along said column in vertical parallelism to said vertical through bore; a workpiece support table disposed in subjacent spaced relation to said spindle support arm and formed along its rear marginal edge with a right angularly dependent slide base having mating machined ways closely slidingly associated with said machined table ways and provided in the included angle between said support table and said slide base with a massive reinforcing web structure to assure and maintain a nonyielding right angular relationship between said table and slide base; drill spindle means fixed in said spindle support arm through bore and including a vertically reciprocable quill journalling a spindle mounting a tool chuck at its lower end defining a drill bit socket of Morse taper form having a coolant chamber at the lower end of said Morse taper and spindle pulley drive means at its upper end, said spindle and said tool chuck being formed with axially extending fluid passage means adapted to supply a cooling lubricant to said coolant chamber of said drill bit socket; drive means comprising an electric motor and super high speed, variable speed pulley drive means supported above the support arm of said frame structure and drive belt means drivingly connecting said varied speed pulley drive means and said spindle pulley drive means; hydraulic powered feed means for reciprocating said quill to feed said spindle toward and away from said workpiece support table at varying speeds correlated to the rotational speed of said spindle and the maximum cutting speed of the metal to be drilled; a source of cooling lubricant under pressure including means for supplying coolant to said spindle at high pressure and high volume; and a drill bit having a Morse taper at one end for mating cooperation with the Morse taper of said tool chuck, an axial coolant passage extending from its opposite cutting end to a point within the chuck coolant chamber, and radial coolant passages opening into said coolant chamber from said axial coolant passage for delivering coolant under pressure through said axial coolant passage to said cutting end of said drill bit to flood the cutting tip and the workpiece with coolant during the drilling operation.

25. A high speed drill press for production use on hard metal workpieces comprising a frame having a base, an upright rigid support column, and a spindle support head mounted on said column and extending forwardly from said column in overlying relationship with said base; workpiece supporting table means positioned above said base; spindle means rotatably and reciprocably mounted on said spindle head in operative association above a workpiece on said table means, said spindle means adapted to support a drill at its lower end; variable speed drive means including a spindle motor drive connected to said spindle means for rotating the same within a wide speed range; hydraulically operated variable rate feed means comprising a hydraulic feed cylinder having a reciprocating piston operatively connected to said spindle means for reciprocating said spindle means toward and away from said table means at a selected rate within a wide feed rate range, a hydraulic feed circuit including a fluid supply source having feed pump means, feed conduit means connecting said feed pump means to spindle-feed and spindle-retract ends of said cylinder for delivering fluid from said source to one of said spindle-feed and spindle-retract cylinder ends and exhaust fluid from the other of said cylinder ends back to said source, solenoid operated feed valve means located in said feed conduit means and normally biased to a neutral position and movable to spindle-feed and spindle-retract ends, respectively, of said cylinder; a coolant fluid supply system for delivering coolant fluid through said spindle means to said drill, said coolant fluid supply system comprising a coolant fluid supply tank, pump means for withdrawing fluid from said tank, coolant conduit means including selectively positionable, solenoid operated, coolant valve means connecting the outlet of said pump means to said spindle means or back to said tank, a sump pump mounted on said base for pumping spent coolant collected therein back to said tank, a plurality of float operated switches positioned at various levels in said tank for controlling operation of said sump pump in response to the fluid level in said tank; an electrical control system for controlling operation of said drill press comprising first circuit means including said float operated switches for turning said sump pump on and off in response to the fluid level in said coolant supply tank, second circuit means for energizing said spindle motor, said feed pump means, and said coolant pump means, said second circuit means including first switch means which prevents current flow in said second circuit means when a dangerously low level of fluid exists in said coolant tank as sensed by one of said float operated switches, third circuit means including spindle-position sensing switch means actuated by said spindle means and indicative of whether said spindle means is in a raised non-drilling position or a lowered drilling position, said second circuit means including second switch means operated in response to actuation of said spindle position sensing switch means to prevent current flow in said second circuit means at initial start-up if said spindle means is not in its non-drilling position, fourth circuit means connected to said second circuit means and including first solenoid means for operating said selectively positionable coolant valve means in said coolant circuit means, said fourth circuit means including third switch means operative in response to said spindle position sensing switch means to prevent actuation of said first solenoid means when said spindle means is in its non-drilling position, thereby positioning said coolant valve means to connect the outlet of said coolant pump means back to said coolant tank and to actuate said first solenoid means when said spindle means moves to a drilling position, thereby positioning said coolant valve means to direct coolant fluid to said spindle means, and fifth circuit means including second solenoid means for operating said feed valve means to one of said spindle-feed and spindle-retract positions, said fifth circuit means including pressure sensitive switch means responsive to a fluid pressure in said feed conduit means indicative of completion of a drilling operation to actuate said second solenoid means and move said feed valve means from its spindle-feed position to its spindle-retract position and thereby automatically retract said spindle means from the workpiece in which a hole of desired depth has been drilled.

26. A high speed drill press as defined in claim 25, comprising an enclosure substantially surrounding said table means and extending vertically between said spindle means and said base, whereby the work area of a drill is substantially completely enclosed to confine the chips and spent coolant fluid and collect them within said base, said enclosure having openable access means, and said control system including an access means sensing switch which prevents a coolant hole drilling operation of said drill press when said access means is inadvertently left open, thereby preventing coolant fluid and chips from being sprayed over an operator and/or an area surrounding the drill press.

27. A high speed drill press as defined in claim 25, said control system including a manually operated drilling mode switch having a first coolant hole position in which said fourth circuit means is connected to said second circuit means so that coolant fluid may be delivered to said spindle means, a second dry position in which said fourth circuit means is disconnected from said second circuit means so that no coolant fluid is delivered to said spindle means and said sump pump does not operate to effect a drilling operation without any coolant, and a third flood position in which said fourth circuit means is disconnected from said second circuit means and said sump pump operates continuously to provide flood coolant fluid into said table means through a separate flood line.

References Cited

UNITED STATES PATENTS

| | | | |
|---|---|---|---|
| 3,075,415 | 7/1963 | Dabringhaus | 408—059 |
| 3,314,312 | 4/1967 | Niehaus et al. | 408—128 |

FRANCIS S. HUSAR, Primary Examiner

U.S. Cl. X.R.

408—130, 234; 74—217, 230.17

UNITED STATES PATENT OFFICE
CERTIFICATE OF CORRECTION

Patent No. 3,702,740          Dated    November 14, 1972

Inventor(s)   David D. Pettigrew

It is certified that error appears in the above-identified patent and that said Letters Patent are hereby corrected as shown below:

Column 7, line 69, change "rotataably" to -- rotatably --.

Column 9, line 65, change "wit" to -- with --.

Column 10, line 1, change "passgeway" to -- passageway --.

Column 10, line 15, before "through" insert -- 234 --.

Column 10, line 18, after "control" insert -- valve --.

Column 17, line 33, change "minutes" to -- minute --.

Column 17, line 41, change "pentration" to "penetration" - both occurrences.

Column 17, line 57, change "essetnial" to -- essential --.

Column 21, line 3, change "craw-foot" to "crow-foot".

Signed and sealed this 1st day of May 1973.

(SEAL)
Attest:

EDWARD M. FLETCHER, JR.          Robert Gottschalk
Attesting Officer                 Commissioner of Patents